United States Patent
Nishikawa

(10) Patent No.: US 9,501,845 B2
(45) Date of Patent: Nov. 22, 2016

(54) INFORMATION PROCESSING APPARATUS AND INFORMATION PROCESSING METHOD FOR CONVERTING SHAPE AND COLOR DATA

(71) Applicant: CANON KABUSHIKI KAISHA, Tokyo (JP)

(72) Inventor: Hiromitsu Nishikawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/805,920

(22) Filed: Jul. 22, 2015

(65) Prior Publication Data

US 2016/0037149 A1    Feb. 4, 2016

(30) Foreign Application Priority Data

Aug. 1, 2014    (JP) .................................. 2014-157624

(51) Int. Cl.
*G06T 11/00* (2006.01)
*G01B 11/25* (2006.01)
*B33Y 50/00* (2015.01)

(52) U.S. Cl.
CPC .............. *G06T 11/001* (2013.01); *B33Y 50/00* (2014.12); *G01B 11/25* (2013.01)

(58) Field of Classification Search
CPC ..................... H04N 13/0037; H04N 13/0246; H04N 13/0257; H04N 13/0422; G06T 11/001
USPC ............ 358/1.2, 2.1; 345/419; 382/241, 285
See application file for complete search history.

(56) References Cited

U.S. PATENT DOCUMENTS

| 8,177,349 | B2 | 5/2012 | Fukui | |
|---|---|---|---|---|
| 2003/0231793 | A1* | 12/2003 | Crampton | G01B 11/2518 382/154 |
| 2010/0302259 | A1* | 12/2010 | Akita | G06T 17/00 345/501 |

FOREIGN PATENT DOCUMENTS

JP    2009-208348 A    9/2009

* cited by examiner

*Primary Examiner* — Jamares Q Washington
(74) *Attorney, Agent, or Firm* — Fitzpatrick, Cella, Harper & Scinto

(57) ABSTRACT

An information processing apparatus obtains shape data including data which indicates vertexes of each of a plurality of polygons representing a stereoscopic object and color data indicating a color of each polygon. The shape data and the color data are converted into shape data and color data in a data format including an area which stores the shape data and an unused area which does not store the shape data. Color data on one of the plurality of polygons is stored in the unused areas corresponding to a plurality of polygons. The converted shape data and color data are output.

13 Claims, 23 Drawing Sheets

| LARGE CATEGORY | SMALL CATEGORY | DATA TYPE | NUMBER OF BYTES |
|---|---|---|---|
| HEADER | CHARACTER STRING | Char[ ] | 80 |
| | NUMBER OF TRIANGLES | Uint32 | 4 |
| NORMAL VECTOR FOR TRIANGLE 1 | NORMAL VECTOR [X, Y, Z] | Float[3] | 4×3 |
| VERTEX 1 OF TRIANGLE 1 | VERTEX [X, Y, Z] COORDINATES | Float[3] | 4×3 |
| VERTEX 2 OF TRIANGLE 1 | VERTEX [X, Y, Z] COORDINATES | Float[3] | 4×3 |
| VERTEX 3 OF TRIANGLE 1 | VERTEX [X, Y, Z] COORDINATES | Float[3] | 4×3 |
| UNUSED DATA | --- | --- | 2 |
| NORMAL VECTOR FOR TRIANGLE 2 | NORMAL VECTOR [X, Y, Z] | Float[3] | 4×3 |
| VERTEX 1 OF TRIANGLE 2 | VERTEX [X, Y, Z] COORDINATES | Float[3] | 4×3 |
| VERTEX 2 OF TRIANGLE 2 | VERTEX [X, Y, Z] COORDINATES | Float[3] | 4×3 |
| VERTEX 3 OF TRIANGLE 2 | VERTEX [X, Y, Z] COORDINATES | Float[3] | 4×3 |
| UNUSED DATA | --- | --- | 2 |
| HEREINAFTER DATA ON TRIANGLE 3 AND SUBSEQUENT TRIANGLES | | | |

FIG.10

| LARGE CATEGORY | SMALL CATEGORY | DATA TYPE | NUMBER OF BYTES OR NUMBER OF BITS |
|---|---|---|---|
| HEADER | --- | --- | 84byte |
| SHAPE DATA FOR TRIANGLE 1 | --- | --- | 48byte |
| UNUSED DATA FOR TRIANGLE 1 | COLOR DATA GROUP FLAG | BOOL | 1bit |
|  | LIGHT SCATTERING DATA GROUP FLAG | BOOL | 1bit |
|  | DATA AREA | unsigned char | 14bit |
| SHAPE DATA FOR TRIANGLE 2 | --- | --- | 48byte |
| UNUSED DATA FOR TRIANGLE 2 | COLOR DATA GROUP FLAG | BOOL | 1bit |
|  | LIGHT SCATTERING DATA GROUP FLAG | BOOL | 1bit |
|  | DATA AREA | unsigned char | 14bit |
| HEREINAFTER DATA ON TRIANGLE 3 AND SUBSEQUENT TRIANGLES |  |  |  |

FIG.13

| LARGE CATEGORY | SMALL CATEGORY | DATA TYPE | NUMBER OF BYTES OR NUMBER OF BITS |
|---|---|---|---|
| HEADER | --- | --- | 84byte |
| SHAPE DATA FOR TRIANGLE 1 | --- | --- | 48byte |
| UNUSED DATA FOR TRIANGLE 1 | COLOR DATA INDEX | Uint8 | 1byte |
|  | LIGHT SCATTERING DATA INDEX | Uint8 | 1byte |
| SHAPE DATA FOR TRIANGLE 2 | --- | --- | 48byte |
| UNUSED DATA FOR TRIANGLE 2 | COLOR DATA INDEX | Uint8 | 1byte |
|  | LIGHT SCATTERING DATA INDEX | Uint8 | 1byte |
| HEREINAFTER DATA ON TRIANGLE 3 AND SUBSEQUENT TRIANGLES |  |  |  |
| COLOR DATA 1 | COLOR DATA | RGB | 24bit |
| COLOR DATA 2 | COLOR DATA | RGB | 24bit |
| HEREINAFTER COLOR DATA 3 AND SUBSEQUENT COLOR DATA |  |  |  |
| LIGHT SCATTERING DATA 1 | LIGHT SCATTERING DATA | GrayScale | 16bit |
| LIGHT SCATTERING DATA 2 | LIGHT SCATTERING DATA | GrayScale | 16bit |
| HEREINAFTER LIGHT SCATTERING DATA 3 AND SUBSEQUENT LIGHT SCATTERING DATA |  |  |  |

FIG.14

| LARGE CATEGORY | SMALL CATEGORY | DATA TYPE | NUMBER OF BYTES OR NUMBER OF BITS |
|---|---|---|---|
| HEADER | --- | --- | 84byte |
| SHAPE DATA FOR TRIANGLE 1 | --- | --- | 48byte |
| COLOR DATA FOR TRIANGLE 1 | DIVISION NUMBER | Uint16 | 2byte |
| | VERTEX DATA FOR FIRST SUB-TRIANGLE | --- | 36byte |
| | COLOR DATA FOR FIRST SUB-TRIANGLE | Unsigned char[3] | 24bit |
| | ... (IT CONTINUES FOR SECOND TO DIVISION-NUMBER-TH SUB-TRIANGLES) | --- | --- |
| LIGHT SCATTERING DATA FOR TRIANGLE 1 | DIVISION NUMBER | Uint16 | 2byte |
| | VERTEX DATA FOR FIRST SUB-TRIANGLE | --- | 36byte |
| | LIGHT SCATTERING DATA FOR FIRST SUB-TRIANGLE | Unsigned char | 8bit |
| | ... (IT CONTINUES FOR SECOND TO DIVISION-NUMBER-TH SUB-TRIANGLES) | --- | --- |
| SHAPE DATA FOR TRIANGLE 2 | --- | --- | 48byte |
| COLOR DATA FOR TRIANGLE 2 | DIVISION NUMBER | Uint16 | 2byte |
| | VERTEX DATA FOR FIRST SUB-TRIANGLE | --- | 36byte |
| | COLOR DATA FOR FIRST SUB-TRIANGLE | Unsigned char[3] | 24bit |
| | ... (IT CONTINUES FOR SECOND TO DIVISION-NUMBER-TH SUB-TRIANGLES) | --- | --- |
| LIGHT SCATTERING DATA FOR TRIANGLE 2 | DIVISION NUMBER | Uint16 | 2byte |
| | VERTEX DATA FOR FIRST SUB-TRIANGLE | --- | 36byte |
| | LIGHT SCATTERING DATA FOR FIRST SUB-TRIANGLE | Unsigned char | 8bit |
| | ... (IT CONTINUES FOR SECOND TO DIVISION-NUMBER-TH SUB-TRIANGLES) | --- | --- |
| HEREINAFTER DATA ON TRIANGLE 3 AND SUBSEQUENT TRIANGLES | | | |

FIG.19

| LARGE CATEGORY | SMALL CATEGORY | DATA TYPE | NUMBER OF BYTES OR NUMBER OF BITS |
|---|---|---|---|
| HEADER | --- | --- | 84byte |
| SHAPE DATA FOR TRIANGLE 1 | --- | --- | 48byte |
| COLOR DATA FOR TRIANGLE 1 | COLOR DATA PALETTE DESIGNATION | Uint8 | 1byte |
| LIGHT SCATTERING DATA FOR TRIANGLE 1 | LIGHT SCATTERING DATA PALETTE DESIGNATION | Uint8 | 1byte |
| SHAPE DATA FOR TRIANGLE 2 | --- | --- | 48byte |
| COLOR DATA FOR TRIANGLE 2 | COLOR DATA PALETTE DESIGNATION | Uint8 | 1byte |
| LIGHT SCATTERING DATA FOR TRIANGLE 2 | LIGHT SCATTERING DATA PALETTE DESIGNATION | Uint8 | 1byte |
| HEREINAFTER DATA ON TRIANGLE 3 AND SUBSEQUENT TRIANGLES | | | |
| COLOR DATA STORAGE AREA TABLE | START ADDRESS OF COLOR DATA 1 | | |
| | HEREINAFTER START ADDRESSES OF COLOR DATA 2 AND SUBSEQUENT COLOR DATA | | |
| LIGHT SCATTERING DATA STORAGE AREA TABLE | START ADDRESS OF LIGHT SCATTERING DATA 1 | | |
| | HEREINAFTER START ADDRESSES OF LIGHT SCATTERING DATA 2 AND SUBSEQUENT LIGHT SCATTERING DATA | | |
| COLOR DATA GROUP | COLOR DATA 1 | RGB x W x H | |
| | HEREINAFTER COLOR DATA 2 AND SUBSEQUENT COLOR DATA | | |
| LIGHT SCATTERING DATA GROUP | LIGHT SCATTERING DATA 1 | RGB x W x H | |
| | HEREINAFTER LIGHT SCATTERING DATA 2 AND SUBSEQUENT LIGHT SCATTERING DATA | | |

FIG.20

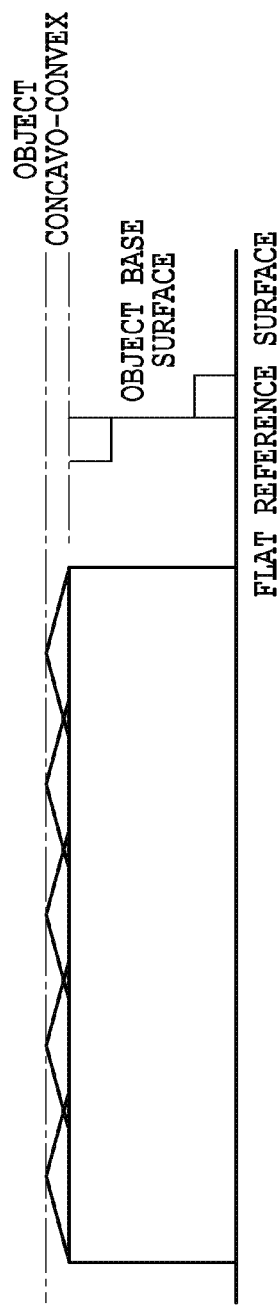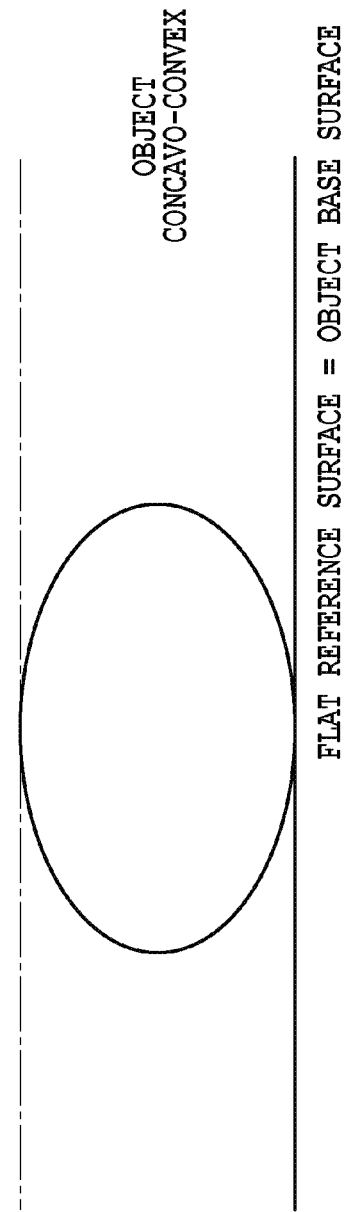
FIG.23A
FIG.23B

INFORMATION PROCESSING APPARATUS AND INFORMATION PROCESSING METHOD FOR CONVERTING SHAPE AND COLOR DATA

BACKGROUND OF THE INVENTION

Field of the Invention

The present invention relates to information processing which handles data on a stereoscopic object.

Description of the Related Art

In order for a printer to print an image, input signal values such as red (R), green (G), blue (B), cyan (C), magenta (M), yellow (Y), and black (K) are converted into color material signal values relating to the amounts of color materials mounted in the printer to be applied to a print medium. It is known to form an image on the print medium with the color materials corresponding to the color material signal values.

In this case, the input signal values are planar RGB data which is obtained by using a digital camera or the like and which indicates a moment in the natural world, CMYK data used for, e.g., a POP advertisement which a designer designs on a display, or the like.

Recently, as disclosed in Japanese Patent Laid-Open No. 2009-208348, surface concavo-convex which can be recognized by touching it with a hand can be formed by thickly applying a UV curable ink which can be cured by ultraviolet rays to form a projection having a thickness in the range of about 1 to a little less than 2 mm on a planar print medium.

Further, a three-dimensional printer is also widely known which receives input of information on a three-dimensional shape represented by triangle sets such as STL and reproduces the three-dimensional shape. STL is an abbreviation for "Standard Triangulated Language" or "Stereolithography." This three-dimensional printer forms a stereoscopic object by using data obtained by slicing an input three-dimensional shape in a lamination direction to laminate material by various known methods such as an optical molding method, a fused spinning deposition method, a powder sintering method, an inkjet method, and an inkjet binder method.

Various methods such as a light-section method, a focus movement method, and a stereo matching method are known as such methods for measuring the three-dimensional shape of an object, and there are devices using such methods.

The texture of a stereoscopic object varies depending on its color, shape, and gloss. There is no information format or mechanism for collectively controlling data which indicates the color, the shape, and the gloss.

For example, a common image format indicating colors is written with RGB or CMYK. Control of a shape relating to thick coating is not stored in the image format. Further, control of a gloss is not stored in the common image format, either.

An information format is desired which controls a color, a shape, and a gloss together when storing or distributing data which indicates the texture of a stereoscopic object.

SUMMARY OF THE INVENTION

According to the present invention, there is an information processing apparatus comprising: an obtaining unit configured to obtain shape data including data which indicates vertexes of each of a plurality of polygons representing a stereoscopic object and color data indicating a color of each polygon; a converting unit configured to convert the shape data and the color data into shape data and color data in a data format including an area which stores the shape data and an unused area which does not store the shape data, wherein color data on one polygon out of the plurality of polygons is stored in the unused areas corresponding to a plurality of polygons; and an outputting unit configured to output the converted shape data and color data.

Further features of the present invention will become apparent from the following description of exemplary embodiments (with reference to the attached drawings).

BRIEF DESCRIPTION OF THE DRAWINGS

FIG. 10 is a table for explaining an STL binary format;

FIG. 13 is a table showing an example of the structure of stereoscopic object data according to Embodiment 2;

FIG. 14 is a table showing a variation of the structure of stereoscopic object data according to Embodiment 2;

FIG. 19 is a table showing an example of the structure of stereoscopic object data according to Embodiment 3;

FIG. 20 is a table showing a variation of the structure of stereoscopic object data according to Embodiment 3;

FIGS. 23A and 23B are views for explaining an example of a method for determining the shape of an object according to Embodiment 4.

DESCRIPTION OF THE EMBODIMENTS

Figure 1:
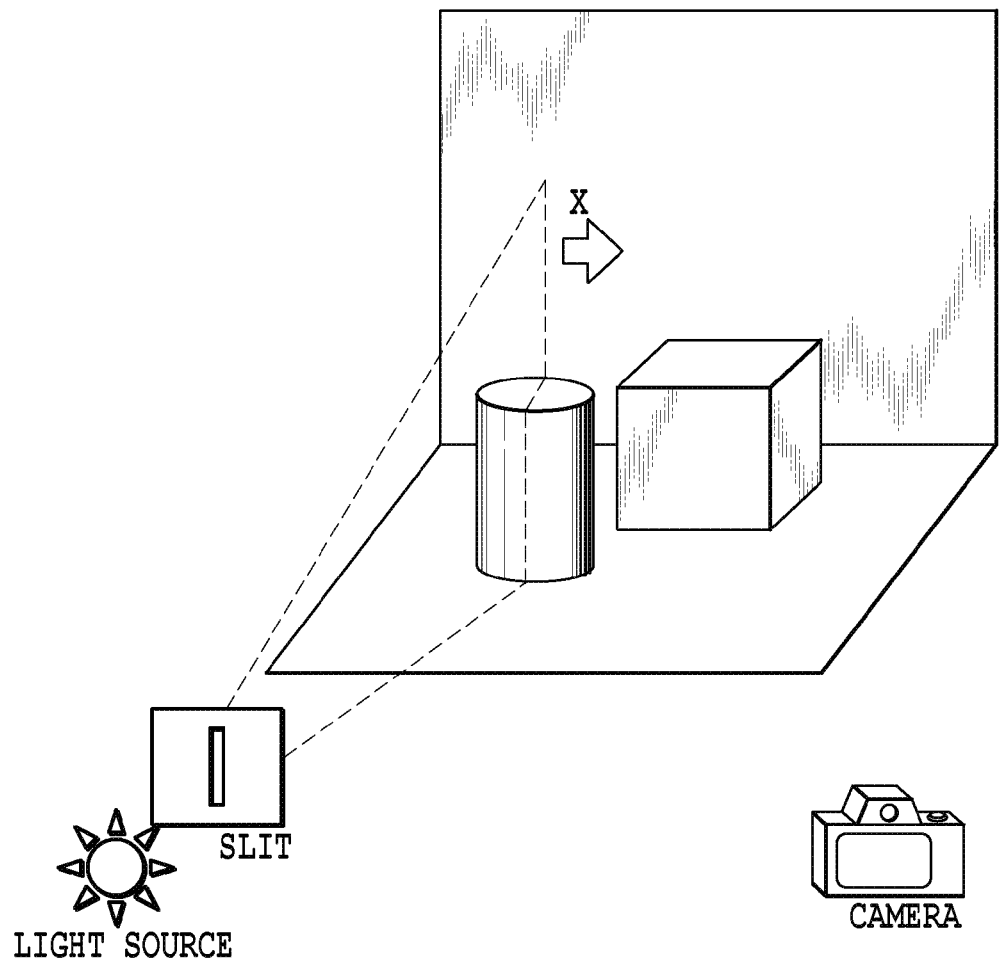
FIG. 1 is a view showing an example of an apparatus arrangement for obtaining a stereoscopic shape according to Embodiment 1.

Embodiments of the present invention will be described below with reference to the drawings. Further, explanation will be made by using the same reference numeral for the same feature. Incidentally, the following embodiments do not limit the present invention as recited in the claims. Further, not all combinations of features explained in the present embodiments are essential to a solving method of the present invention.

Embodiment 1

In Embodiment 1, first, information on the components of a stereoscopic object is obtained and retained. The information on the components of the stereoscopic object is information such as the shape, color, and material surface gloss of the stereoscopic object. Hereinafter, this information will be collectively referred to as stereoscopic object data. Thereafter, the obtained stereoscopic object data is processed in a unified manner, and a UV curing-type printer reproduces the stereoscopic object.

<Method for Obtaining Stereoscopic Shape Data>

As described above, various methods such as a light-section method, a focus movement method, and a stereo matching method are known as methods for obtaining shape data on a stereoscopic object.

FIG. 1 shows an apparatus arrangement relating to a light-section method. As shown in FIG. 1, slit light from a light source is emitted to an object having a three-dimensional shape. The position of light on the object is obtained by triangulation in a case where the positions of the light source and the sensor (camera) are already known, and accordingly, the three-dimensional shape can be measured by obtaining the slit light in a case where the slit light is scanned over the entire object in a direction indicated by an arrow X of FIG. 1.

<Method for Obtaining Stereoscopic Color Data>

Next, explanation will be made on a method for obtaining color data on a stereoscopic object. Generally, a method for measuring the color of a reflective object uses a spectrophotometer, a spectral emission luminance meter, or the like. For example, assuming that the angle of a normal to the surface of the reflective object is 0 degrees, a color is measured by measuring the spectral reflectance of light which is incident at an angle of 45 degrees and which is received at an angle of 0 degrees.

However, it is generally difficult to measure a stereoscopic object having a three-dimensional shape by using a measurement device for measuring a flat sample. Various methods are studied as methods for measuring the color of a stereoscopic object having a three-dimensional shape. As one of these methods, there is a method using a plurality of light sources and a sensor as in an example shown in FIG. 2. In this method, desirably, sensing is performed by using a hyper-spectral camera capable of simultaneously obtaining two-dimensional space information and spectral information. However, the present invention is not limited to this feature, and it is possible to obtain the color of a stereoscopic object by using a digital camera which is calibrated to the sRGB color space or the like instead.

Figure 2:
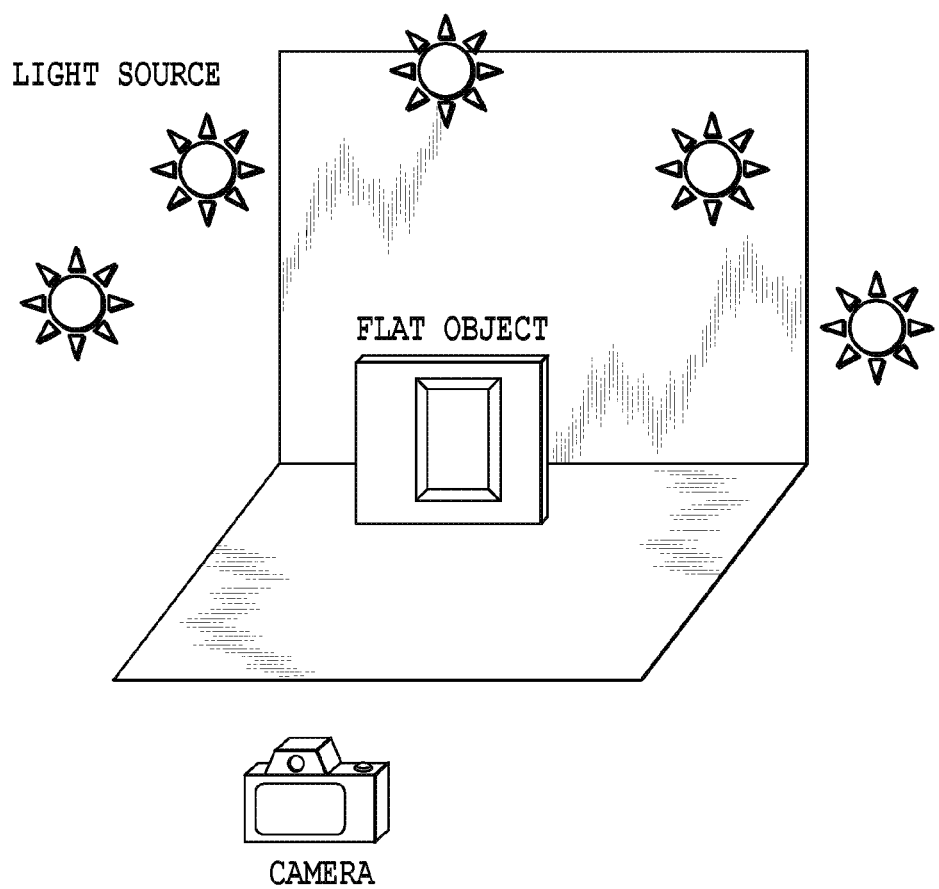
FIG. 2 is a view showing an example of stereoscopic sensing using a plurality of light sources according to Embodiment 1.

In the configuration shown in FIG. 2, a geometrical condition for the sensor and the sample is fixed. As shown in FIG. 2, the plurality of light sources are provided around the sample, and a geometrical condition for each light source and the sample is already known. Further, in a case where the stereoscopic shape of the sample is already known by performing the above-described method for obtaining stereoscopic shape data, it is possible to calculate a normal direction at a position on the stereoscopic object corresponding to each pixel of the sensor. In other words, it is possible to specify a light source which is positioned in a regular reflection direction relative to the position on the stereoscopic object corresponding to each pixel of the sensor. More specifically, in the configuration shown in FIG. 2, a color at the position on the stereoscopic object corresponding to each pixel of the sensor is a sensor-obtained value in a setting in which out of all the light sources, only the light source which is positioned in the regular reflection direction is off.

Further, in another method, light other than regular reflection light may be received by providing all the light sources with a polarizing filter in a unique direction and providing the sensor with a polarizing filter in a direction orthogonal to those of the polarizing filters in the light sources.

<Method for Obtaining Stereoscopic Light Scattering Data>

Next, explanation will be made on a method for obtaining light scattering data on a stereoscopic object which is information indicating the gloss of a stereoscopic object. In general, light scattering on a surface which is a reflection characteristic of a reflection object is measured by providing the light source and the sensor in the regular reflection direction relative to the surface of the sample.

As has been described above with respect to the above-described method for obtaining stereoscopic color data, in the configuration of the example shown in FIG. 2, the sample and the sensor are fixed, and a normal direction in the sample corresponding to each pixel of the sensor is already known. Accordingly, it is possible to specify the light source which is positioned in the regular reflection direction relative to the position on the stereoscopic object corresponding to each pixel of the sensor. In the configuration shown in FIG. 2, light scattering data on the stereoscopic object at a position corresponding to each pixel of the sensor is a sensor-obtained value in a setting in which out of all the light sources, only the light source positioned in the regular reflection direction is on.

<Configuration of an Apparatus for Processing Stereoscopic Object Data and Processing Steps>

(Configuration of an Apparatus for Processing Stereoscopic Object Data)

Figure 3:
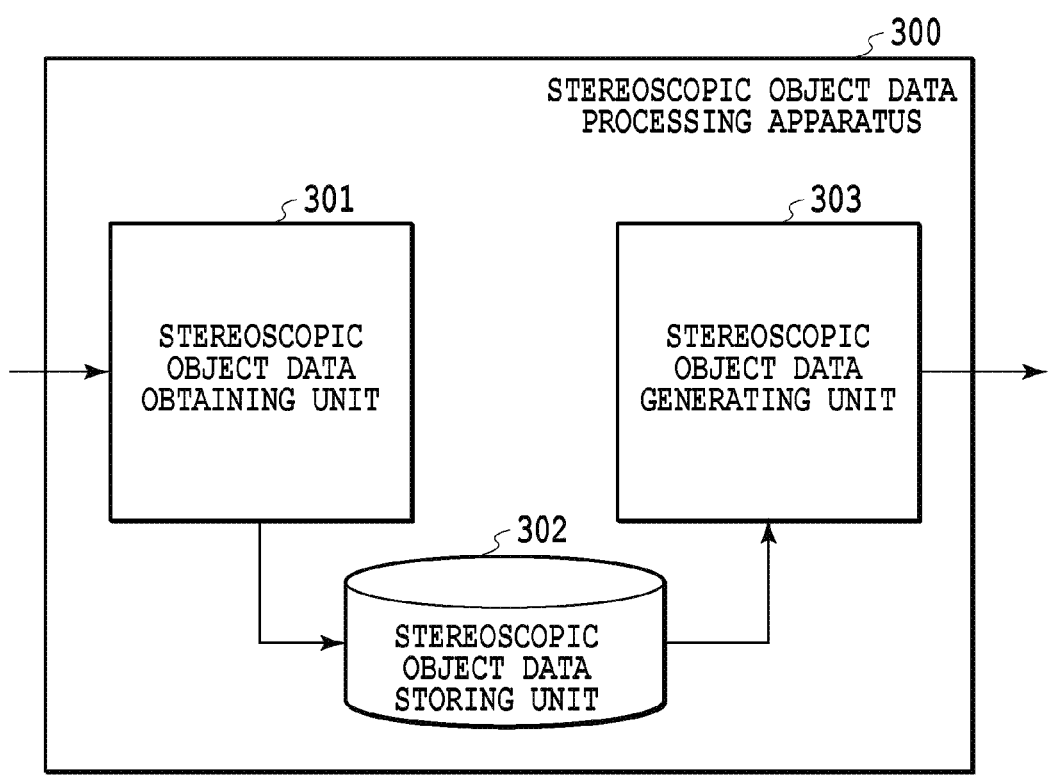
FIG. 3 is a diagram showing an example of the configuration of a stereoscopic object data processing apparatus according to Embodiment 1.

FIG. 3 is a diagram showing the configuration of a stereoscopic object data processing apparatus 300 which is an information processing apparatus according to the present embodiment. The stereoscopic object data processing apparatus 300 includes: a stereoscopic object data obtaining unit 301 for obtaining stereoscopic object data; a stereoscopic object data storing unit 302 for storing stereoscopic object data; and a stereoscopic object output data generating unit 303 for outputting stereoscopic object output data by using an output apparatus.

(Configuration of a Stereoscopic Object Data Obtaining Unit)

Figure 4:
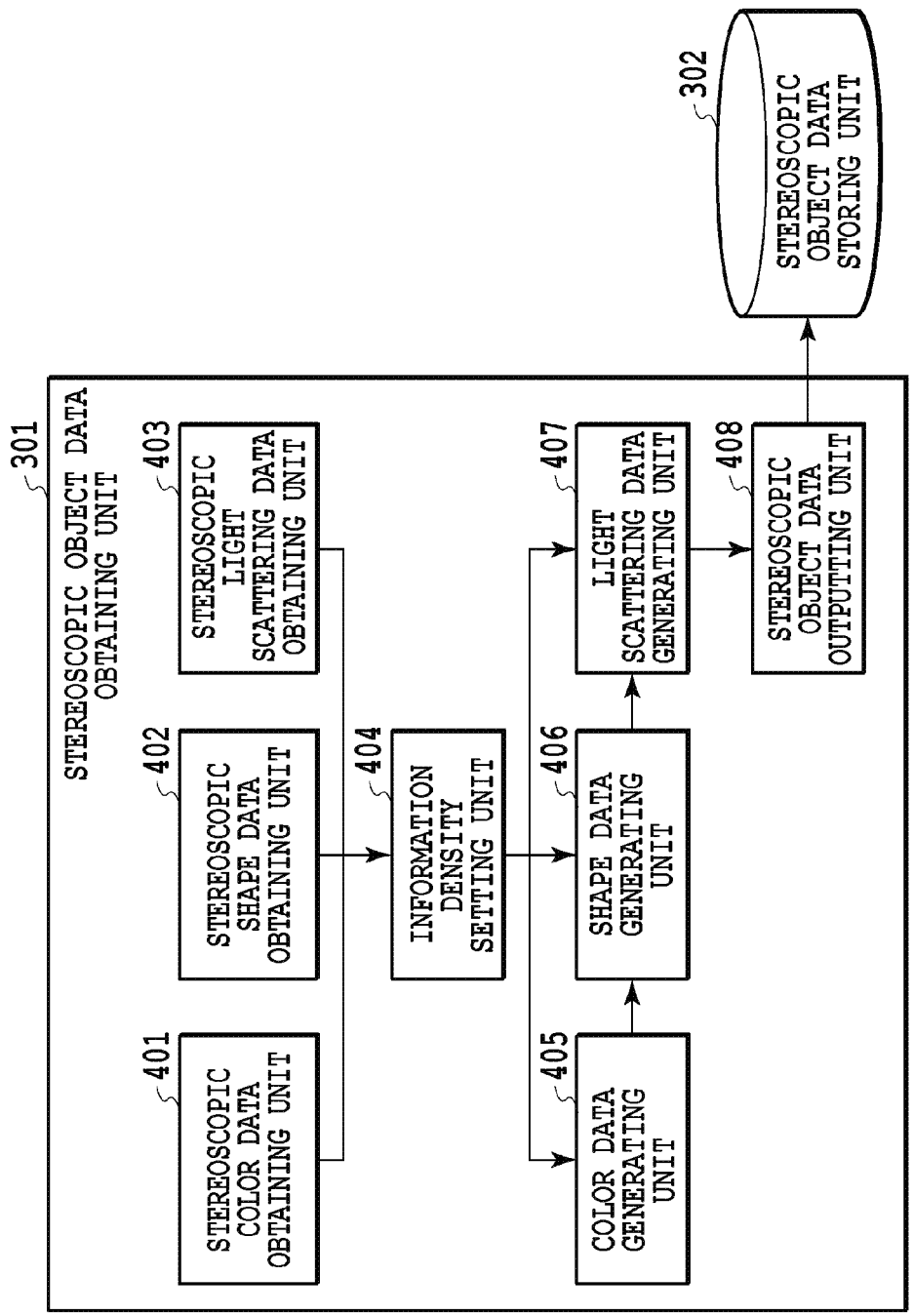
FIG. 4 is a diagram showing an example of the configuration of a stereoscopic object data obtaining unit according to Embodiment 1.

FIG. 4 is a diagram showing, in details, the configuration of the stereoscopic object data obtaining unit 301 of the stereoscopic object data processing apparatus 300. The stereoscopic object data obtaining unit 301 includes: a stereoscopic color data obtaining unit 401; a stereoscopic shape data obtaining unit 402; a stereoscopic light scattering data obtaining unit 403; and an information density setting unit 404. Further, the stereoscopic object data obtaining unit 301 includes: a color data generating unit 405; a shape data generating unit 406; a light scattering data generating unit 407; and a stereoscopic object data outputting unit 408.

The stereoscopic color data obtaining unit 401 obtains color data on a target stereoscopic object. The stereoscopic shape data obtaining unit 402 obtains shape data on the target stereoscopic object. The stereoscopic light scattering data obtaining unit 403 obtains light scattering data on the target stereoscopic object. Methods for obtaining these types of information have been described above.

The information density setting unit 404 sets an information density according to the obtained color, shape, and light scattering of the stereoscopic object. The information density indicates the data amount of information, and is the resolution and/or bit depth of information indicating the color, the shape, and the light scattering, for example. The color data generating unit 405 converts the color data obtained by the stereoscopic color data obtaining unit 401 according to the information density set by the information density setting unit 404. The shape data generating unit 406 converts the shape data obtained by the stereoscopic shape data obtaining unit 402 according to the information density set by the information density setting unit 404. The light scattering data generating unit 407 converts light scattering data obtained by the stereoscopic light scattering data obtaining unit 403 according to the information density set by the information density setting unit 404. As information indicating the texture of the stereoscopic object, the amount of the data indicating the color, the shape, and the light scattering may become large. Accordingly, from the viewpoint of storage capacity, transmission capacity, or the like, it is not preferable to simply use data obtained by combining these types of information. On the other hand, the reproducing capability of a printer to be used and a human's sensitivity for observing a reproduced object vary depending on the color, the shape, and the gloss. Accordingly, each type of information is converted according to the information density set by the information density setting unit 404. The details will be given later.

The stereoscopic object data outputting unit 408 associates or links the generated color data, shape data, and light scattering data with one another, and outputs the associated or linked data to the stereoscopic object data storing unit 302.

(Operation of the Stereoscopic Object Data Obtaining Unit)

Figure 5:
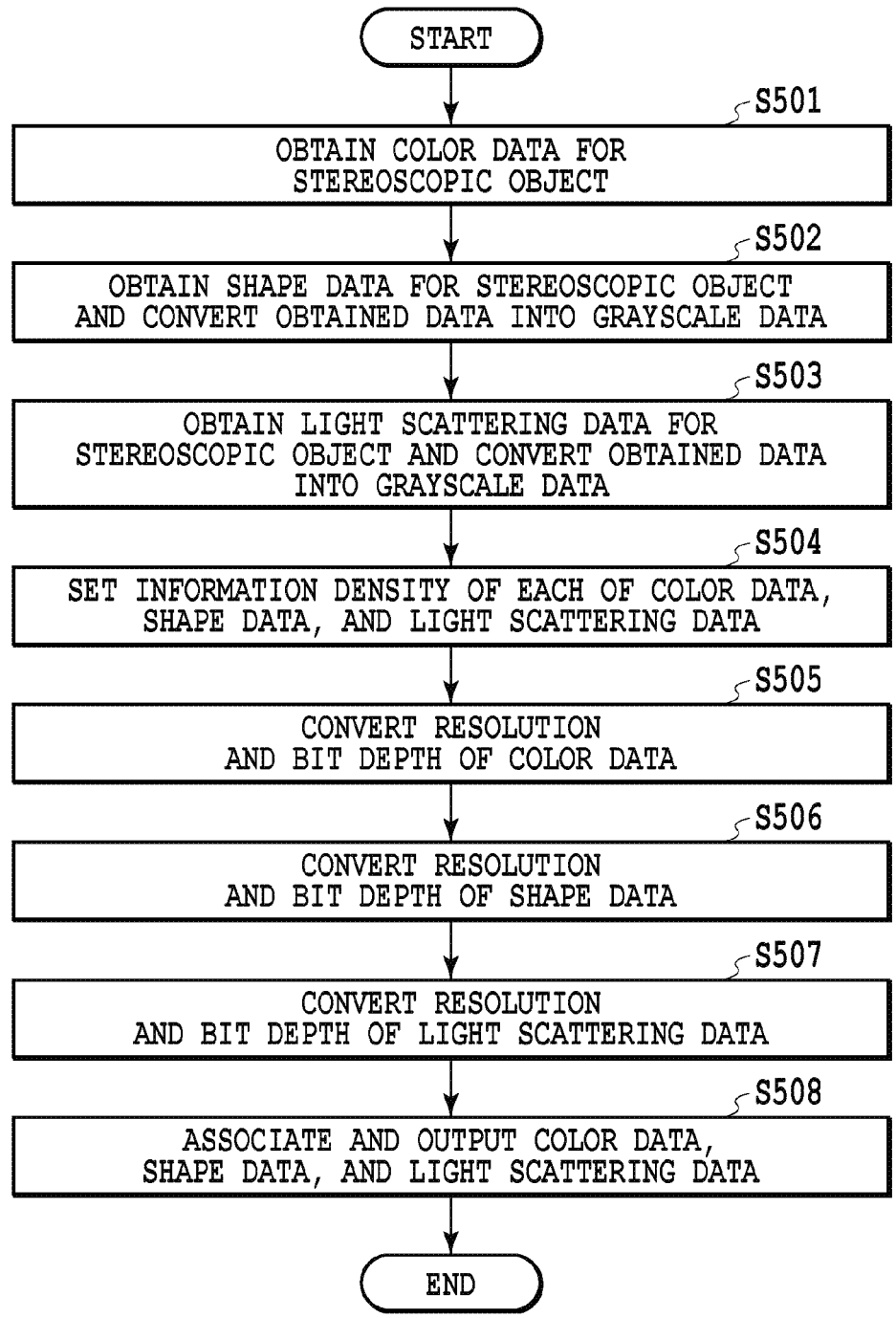
FIG. 5 is a flowchart showing a flow for obtaining stereoscopic object data according to Embodiment 1.

FIG. 5 is a flowchart showing the operation of the stereoscopic object data obtaining unit 301 shown in FIG. 4. A flow shown in FIG. 5 which is the flowchart is realized by a CPU executing a program stored in a ROM, a RAM, or the like (not shown) of the stereoscopic object data processing apparatus 300, whereby the stereoscopic object data obtaining unit 301 functions. Flows shown in flowcharts described below in the present specification are also realized by the CPU executing a program stored in a ROM, a RAM, or the like (not shown). Explanation will be made below with reference to FIG. 5.

First, in step S501, the stereoscopic color data obtaining unit 401 obtains color data on the surface of the stereoscopic object according to the above-described method for obtaining stereoscopic color data. The obtained information is, for example, sRGB data in a case where a calibrated digital camera is used as the sensor. The present embodiment is described assuming that the color data is sRGB, but the present invention is not limited to this. As described above, each pixel may be provided with information on spectral reflectance which is obtained by using a hyper-spectral camera. In this case, it is possible to achieve the advantage that color conversion can be performed according to the spectral emission luminance of a light source which is observed in outputting data. Further, it is well known that it is possible to achieve the advantage that color matching can be performed according to the spectral reflectance of a color material included in a device at the time of outputting data. Incidentally, sRGB data is a generally-known RGB image format and is also a format which encompasses gray-scale data having a 16-bit depth for each color.

Figure 6:
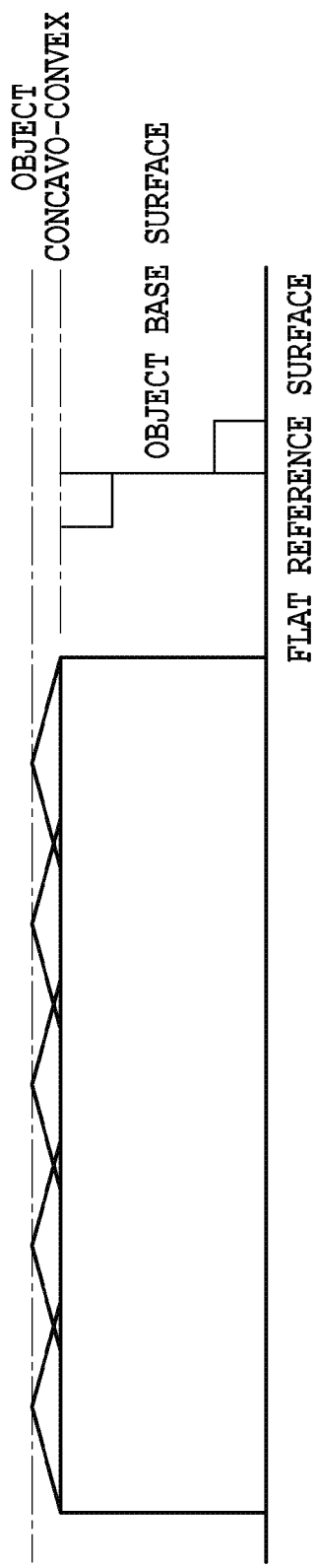
FIG. 6 is a view for explaining an example of a method for measuring the shape of an object according to Embodiment 1.

Next, in step S502, the stereoscopic shape data obtaining unit 402 obtains shape data indicating concavo-convex on the surface of the stereoscopic object according to the above-described method for obtaining stereoscopic shape data. FIG. 6 shows a cross section in a case where the stereoscopic object represented by the data is provided on a horizontal reference surface. As shown in FIG. 6, in a case where the stereoscopic object represented by the data has a flat portion (a canvas in the case of an oil painting) in its stereoscopic shape like a relief and an oil painting, for example, concavo-convex is obtained by using, as the shape data, object concavo-convex which is differences from the flat portion (object base surface). The obtained concavo-convex data is converted into 8-bit gray-scale data indicating a height, for example. For example, the concavo-convex data is converted into the gray-scale data in which the level of the object base surface is 0 and the maximum amplitude of the object concavo-convex is 255.

In step S503, the stereoscopic light scattering data obtaining unit 403 obtains light scattering data indicating the gloss of the surface of the stereoscopic object according to the above-described method for obtaining stereoscopic light scattering data. The obtained light scattering data is image data which is only a collection of pixel values corresponding to regular reflection out of a plurality of sensor output values obtained by varying a light source, for example. In a case where the used sensor is a digital camera, the image data which is the collection of pixel values is sRGB image data, and is converted into 8 bits to 16-bit luminance image (gray-scale data) by using a known conversion formula. Further, it is desirable that the light scattering data be the sensor output values of a digital camera (generally-known RAW data), and in this case, it is possible to obtain, as the light scattering data, data to be subjected to luminance conversion from the sensor output values into sRGB or the like.

Next, in step S504, the information density setting unit 404 sets the information density of each of the color data, the shape data, and the light scattering data on the stereoscopic object. Setting the information density includes, for example, setting, as the information density of the color data, a combination of a maximum resolution and a bit depth in any unit space in the stereoscopic object. A combination of an intermediate resolution and the bit depth in the unit space is set as the information density of the shape data. A combination of a minimum resolution and the bit depth in the unit space is set as the information density of the light scattering data. For example, the following combination is set. A combination of a resolution of about 600 to about 1200 ppi and a bit depth of 8 to 16 bits for each color of RGB data is set for the color data. A combination of a resolution of about 300 to about 600 ppi and a bit depth of 8 bits as gray-scale data is set for the shape data. A combination of a resolution of about 100 to about 300 ppi and a bit depth of 8 to 16 bits as gray-scale data is set for the light scattering data. This makes it possible to obtain the color data, the shape data, and the light scattering data which have resolutions varying depending on each component, whereby it becomes possible to reduce the amount of data as compared with the case of matching the resolution of the data with a maximum resolution.

In this manner, the amounts of some types of data indicating the texture of the stereoscopic object are reduced according to the reproducing capability of a printer and a human's sensitivity for observing a reproduced object, whereby while it becomes possible to reduce the amount of data, it becomes possible to reproduce the stereoscopic object having the same texture based on the data whose amount is reduced. In the present embodiment, the information densities are set to convert the data to reduce the amount of data such that the resolution and the bit depth decrease in order of the color data, the shape data, and the light scattering data. However, it is not necessary to decrease the resolution and the bit depth in this order. Data conversion only has to be performed so that the amount of at least one of the color data, the shape data, and the light scattering data is reduced according to the information densities set as described later.

Further, the information densities can be set in consideration of the reproducing capability of an outputting device and a human's visual characteristics (resolution) as described above. The resolution can be considered by performing the following simple test, for example.

Figure 7:
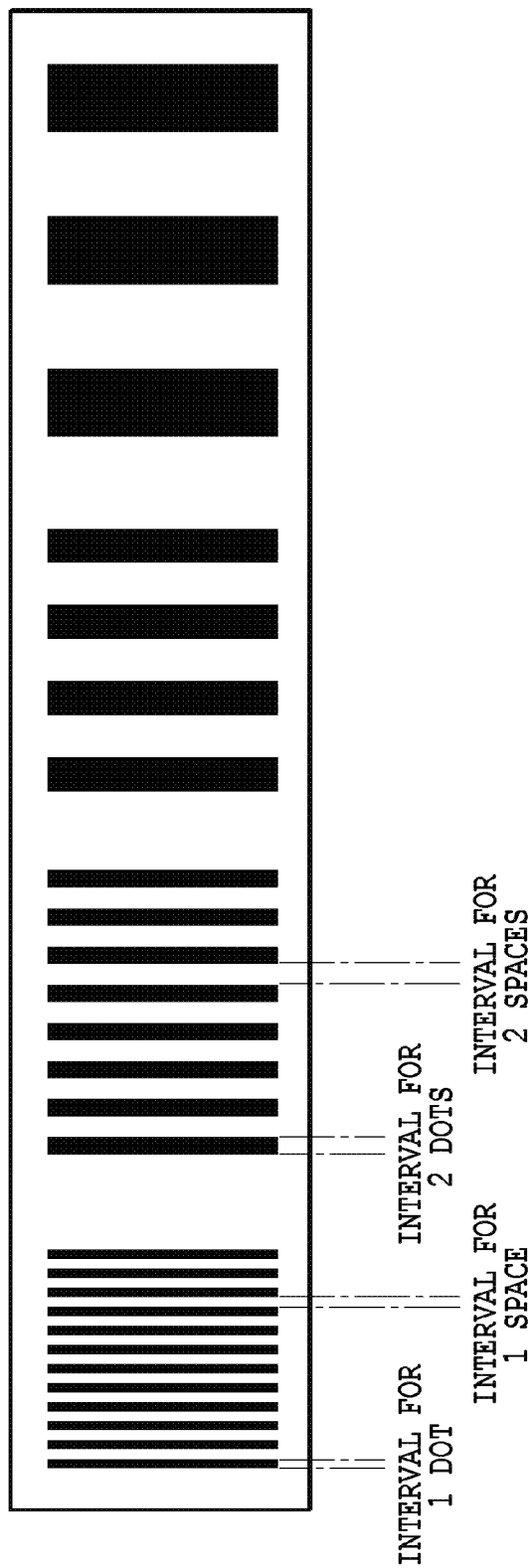
FIG. 7 is a chart showing an example of an information density determination chart according to Embodiment 1.

FIG. 7 is a chart showing a generally-used square wave. As shown in FIG. 7, the square wave is represented by binary data, and various intervals are set. In the case of a specific UV curing-type printer as a stereoscopic object forming apparatus, for example, the smallest pattern with minimum intervals and combinations of one dot and one space in FIG. 7 is used for a maximum resolution of the printer. Likewise, the resolution of a pattern varies as in a pattern with combinations of two dots and two spaces and a pattern with combinations of three dots and three spaces. Output resolution for a shape and light scattering can be determined by using the above patterns.

For example, as for a shape, the superimposing printing function of the UV curing-type printer is used. As is well known, the UV curing-type printer ejects an ink on a print medium and thereafter cures the ink with UV light. Accordingly, unlike a printer using another aqueous ink, the UV curing-type printer can perform printing to form a layer having a thickness of about 1 to about 2 mm by repeating the operation of ejecting and curing the ink. Superimposing printing is performed only on black portions in the chart shown in FIG. 7, for example, by using the above function, and thereafter, measurement is performed visually or by performing the above-described method for obtaining stereoscopic shape data or the like. In a case where the resolution of a printer is not sufficient, it is possible to confirm a phenomenon that there is no difference in height between black portions and white portions in the chart. Further, it is possible to confirm the shape by touching the ink. For example, in a case where in FIG. 7, the resolution of a printer is not sufficient for a chart image with intervals of one dot and the resolution of the printer is sufficient for a chart image with intervals of two dots, an information density corresponding to the interval of two dots is used. More specifically, since the printer cannot perform reproduction by using an information density corresponding to the interval of one dot, such data is redundant, and a lower resolution does not impair the reproducibility of the texture. Further, the same can be said for visual measurement. A high resolution whose difference cannot be recognized with a human's eyes is redundant as data, and a lower resolution does not impair the visibility of the texture. More specifically, it is enough to use an information density which can be sensed with a human's visual characteristics. Further, desirably, measurement with higher precision and higher reproducibility is made possible by outputting a plurality of charts like the chart in FIG. 7 according to a difference in height (the number of times of superimposing printing).

As disclosed in Japanese Patent Laid-Open No. 2009-208348, for example, light scattering (a gloss) is adjusted by using characteristics that the gloss performance of a print surface can be changed by adjusting a clear ink and timing of curing with UV light in a UV curing-type printer. In such a method, the chart in FIG. 7 is used to adjust black portions and white portions to have a high gloss and a low gloss, respectively and perform output, and measurement is performed visually or by performing a method such as the above-described method for obtaining stereoscopic light scattering data. In a case where the resolution of the printer is not sufficient, it is possible to confirm a phenomenon that there is no difference in gloss between the black portions and the white portions in the chart. Further, desirably, measurement with higher precision and higher reproducibility is made possible by outputting a plurality of charts like FIG. 7 according to a difference in gloss.

In this manner, it is possible to set an information density according to the reproducing capability of an outputting device. Further, it is possible to set an information density according to a visual resolution for the color, the shape, and the light scattering. Various studies are made on the visual resolution, but it is possible to easily determine the visual resolution by visually evaluating a chart like FIG. 7 which is to be measured, for example. A degree to which it is possible to reduce so-called redundant data which does not affect the reproducibility of the texture can be set by setting an information density. Data indicating an information density for an outputting device may be transmitted from the outputting device to a stereoscopic object data processing apparatus or may be obtained by the stereoscopic object data processing apparatus from the outputting device in step S504.

In step S505, the color data generating unit 405 converts color data obtained in step S501 according to the information density for the color data set in step S504. For example, the color data generating unit 405 converts at least one of the resolution and bit depth of the color data to generate color data. The conversion discussed here is conversion for enlarging or reducing RGB data so that the number of pixels per inch in length is 1200, for example, as compared with the size of the stereoscopic object in real space. The image resolution conversion performed here may be realized by performing a well-known method such as a bicubic method, a bilinear method, or a nearest neighbor method, but in consideration of continuity of color change and the like, the image resolution conversion is implemented by performing the bicubic method or the like. Further, the bit depth is 16 bits, for example, and the data obtained in step S501 is used as it is. Further, in a case where the bit depth of the input data is different from the bit depth for the color data in the information density set in step S504, well-known bit compression or expansion processing may be used.

Next, in step S506, the shape data generating unit 406 converts the shape data obtained in step S502 according to the information density for the shape data set in step S504. For example, shape data is generated by converting at least one of the resolution and bit depth of the shape data. The conversion discussed here is conversion for enlarging or reducing gray-scale data so that the number of pixels per inch in length is 600, for example, as compared with the size of the stereoscopic object in real space. The image resolution conversion performed here may be realized by performing a well-known method such as the bicubic method, the bilinear method, or the nearest neighbor method, but in consideration of preservation of an edge in the shape and the like, the image resolution conversion is implemented by performing the nearest neighbor method or the like. Further, the bit depth is 8 bits, for example, and the data obtained in step S502 is used as it is. Further, in a case where the bit depth of the input data is different from the bit depth for the shape data in the information density set in step S504, well-known bit compression or expansion processing may be used.

Next, in step S507, the light scattering data generating unit 407 converts the light scattering data obtained in step S503 according to the information density for the light scattering data set in step S504. For example, light scattering data is generated by converting at least one of the resolution and bit depth of the light scattering data. The conversion discussed here is conversion for enlarging or reducing gray-scale data so that the number of pixels per inch in length is 300, for example, as compared with the size of the stereoscopic object in real space. The image resolution conversion performed here may be realized by performing a well-known method such as the bicubic method, the bilinear method, or the nearest neighbor method, but in consideration of preservation of a difference in the gloss and the like, the image resolution conversion is implemented by performing the nearest neighbor method or the like. Further, the bit depth is 16 bits, for example, and the data obtained in step S503 is used as it is. Further, in a case where the bit depth of the input data is different from the bit depth for the shape data in the information density set in step S504, well-known bit compression or expansion processing may be used.

In step S508, the stereoscopic object data outputting unit 408 associates and outputs to the stereoscopic object data storing unit 302 the color data, the shape data, and the light scattering data generated in steps S505 to S507. Further, the above three pieces of information may be combined. In a case where step S506 ends, the operation of the stereoscopic object data obtaining unit 301 ends. Incidentally, the stereoscopic object data stored in the stereoscopic object data storing unit 302 may be transmitted to another apparatus via a storage medium or a network.

Further, in a case where the outputting UV curing-type printer is already known, the information densities for the color, the shape, and the light scattering are already known, and accordingly, each obtaining unit may obtain the data with an information density suitable for the printer.

(Configuration of the Stereoscopic Object Output Data Generating Unit)

Figure 8:
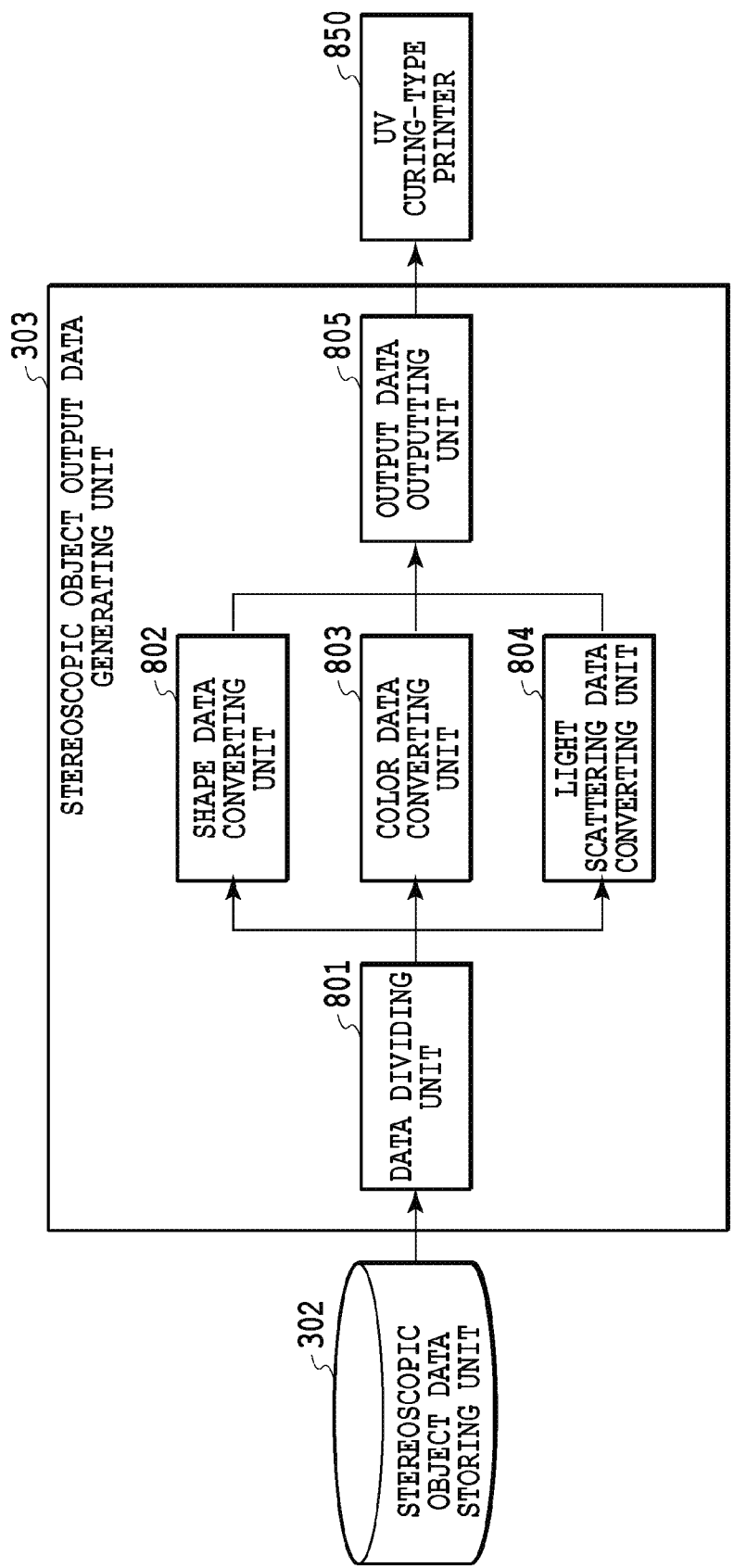
FIG. 8 is a diagram showing an example of the configuration of a stereoscopic object output data generating unit according to Embodiment 1.

FIG. 8 is a diagram showing, in details, the configuration of the stereoscopic object output data generating unit 303 in the stereoscopic object data processing apparatus 300. The stereoscopic object output data generating unit 303 includes a data dividing unit 801, a shape data converting unit 802, a color data converting unit 803, a light scattering data converting unit 804, and an output data outputting unit 805.

The data dividing unit 801 divides the stereoscopic object data obtained from the stereoscopic object data storing unit 302 into the color data, the shape data, and the light scattering data. The shape data converting unit 802 converts the divided gray-scale shape data into a printer control signal indicating the number of times of superimposing an ink by the UV curing-type printer. The color data converting unit 803 converts the divided RGB color data into a printer control signal indicating an ink color which matches a color volume which can be reproduced by the UV curing-type printer. The light scattering data converting unit 804 converts the divided gray-scale light scattering data into a print control signal for controlling ejection of a clear ink by the UV curing-type printer and curing timing. The output data outputting unit 805 outputs each printer control signal for the UV curing-type printer to the UV curing-type printer 850.

As stated above, the stereoscopic object data stored in the stereoscopic object data storing unit 302 is information obtained by converting at least one of the color data, the shape data, and the light scattering data. In a case where the control signals are output to the same printer, since the printer can receive only one resolution, conversion is performed so that the resolution of each type of data matches the resolution of highest-resolution data, for example.

(Operation of the Stereoscopic Object Output Data Generating Unit)

Figure 9:
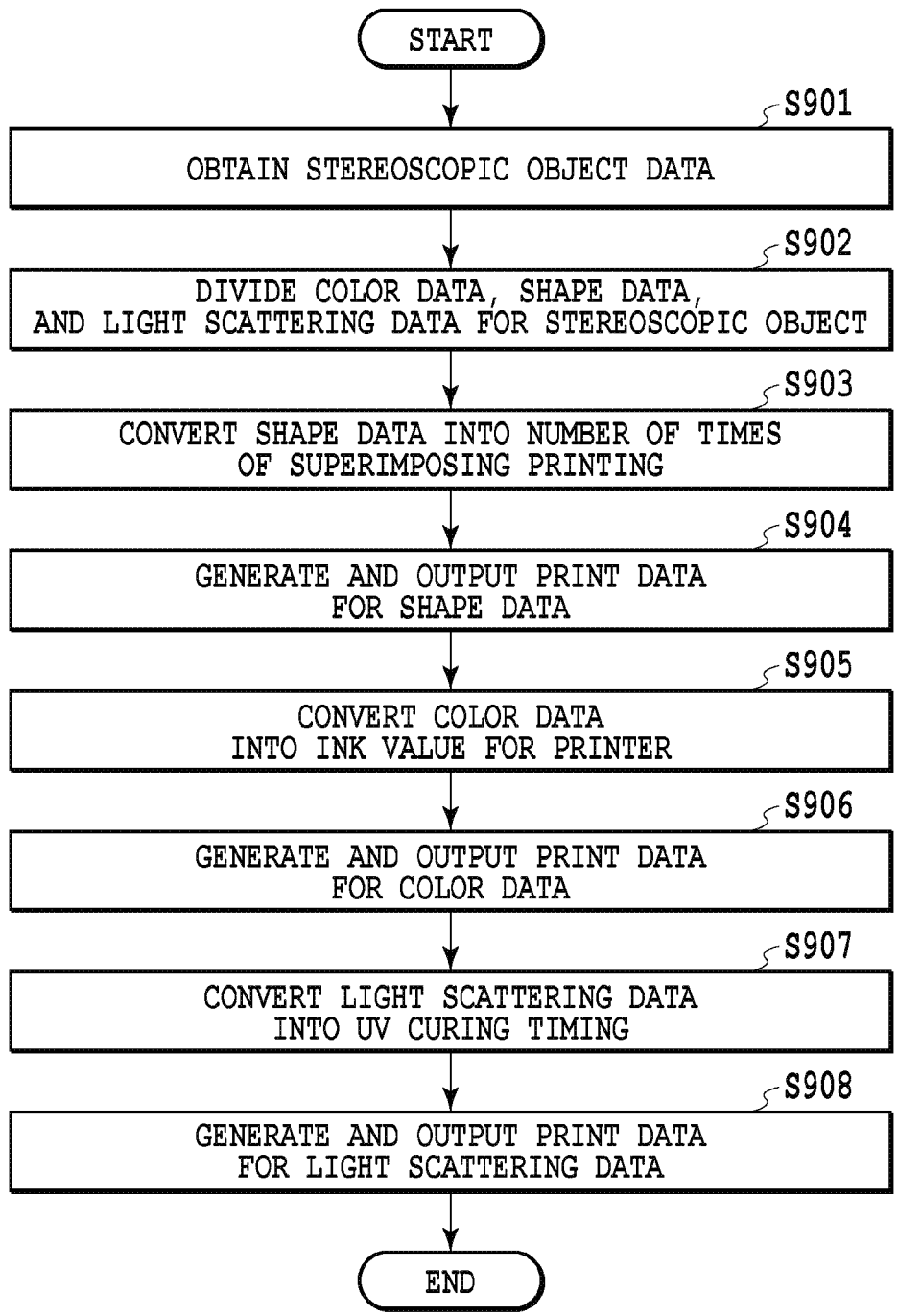
FIG. 9 is a flowchart showing a flow for generating stereoscopic object output data according to Embodiment 1.

FIG. 9 is a flowchart showing the operation of the stereoscopic object output data generating unit 303 shown in FIG. 8. Explanation will be made below with reference to FIG. 9.

First, in step S901, the data dividing unit 801 obtains the associated and stored stereoscopic object data from the stereoscopic object data storing unit 302.

Next, in step S902, the data dividing unit 801 divides the stereoscopic object data obtained in step S901 into the color data, the shape data, and the light scattering data to be converted into individually different data signals for a printer.

In step S903, the shape data converting unit 802 extracts the shape data from the stereoscopic object data divided in step S902, and converts the shape data into the number of times of superimposing as the control signal for the printer after performing resolution conversion according to the resolution of the printer. The resolution conversion performed here is converting data of 600 ppi, for example, into a resolution of 720 ppi or 1200 ppi for the printer, for example. Incidentally, a resolution conversion method may be realized by performing a well-known method such as the bicubic method, the bilinear method, or the nearest neighbor method, but in consideration of preservation of an edge in the shape and the like, the resolution conversion method is implemented by performing the nearest neighbor method or the like. Further, in a case where the outputting UV curing-type printer is already known, conversion into the number of times of superimposing performed here depends on the performance of the printer, and particularly depends on a distance between a print medium and a head. Accordingly, in a case where there is a limitation on the number of times of superimposing in the printer, the 8-bit gray-scale shape data only has to be linearly quantized within the limitation on the number of times of superimposing in the printer. In this case, in a case where the maximum number of times of superimposing is 100, for example, data in the shape data having a value of 0 to 255 is linearly compressed into data having a value of 0 to 100. Further, in a case where there is no limitation on the number of times of superimposing in the printer, the number of times of superimposing may exceed 255. However, in a case where the distance between the print medium and the head is too large, there arises a problem that inks are mixed on the surface of the head to soil an image, and accordingly, it is desirable that the maximum number of times of superimposing be 255. Further, in a case where the resolution is doubled from 600 ppi to 1200 ppi, for example, by performing the nearest neighbor method or the like, it is also possible to finely adjust a height by using area gradation. In this case, a height achieved by performing superimposing printing one time, for example, can be selected from four levels, and even in a case where the maximum number of times of superimposing printing is 100, it is possible to realize 400-level tone height representation. In this manner, in a case where the resolution is increased by a factor of two or more, the number of representation tone levels can be made larger than the number of times of superimposing printing.

Further, the type of ink used in this step of superimposing is not particularly limited, but it is desirable to use a white ink for several times of superimposing printing for the uppermost surface and use a clear ink for a lower layer. The advantage that color reproduction and low cost can be realized is achieved by forming most of the shape with the clear ink and covering the uppermost surface with the white ink. However, in this case, the number of times of superimposing the white ink is the same across the whole surface, and accordingly, the white ink may be uniformly applied to an upper layer of the clear ink regardless of the number of times of superimposing the clear ink in a lower layer. In this case, the problem does not arise that the surface of the print medium is not sufficiently coated with the white ink in a case where the number of times of superimposing the clear ink in the lower layer is smaller than the number of times of superimposing the white ink, for example.

Next, in step S904, the output data outputting unit 805 outputs, to the UV curing-type printer 850, the printer control signal indicating the total number of times of superimposing and the types of inks for the number of times of superimposing. For example, the output data outputting unit 805 outputs the total number of times of superimposing which is the number of times of superimposing the clear ink for each pixel plus three which is the number of times of superimposing the white ink and the types of inks which are the clear ink and the white ink for the number of times of superimposing.

In step S905, the color data converting unit 803 extracts the color data from the stereoscopic object data divided in step S902, and converts the color data into an ink ejection signal as the printer control signal. A method for converting RGB data into the ink ejection signal for the printer includes color matching, color separation for converting RGB into printer ink values (for example, CMYK), and quantization for converting multivalued ink values into the number of tone levels for one dot which can be reproduced by the printer. Any of these methods can be realized by using a well-known technique. As for the color matching and the color separation, for example, there is a method for mapping sRGB colors to color regions which can be reproduced by the printer and converting the sRGB colors into ink values by using a well-known technique which employs a lookup table (LUT) represented by an ICC profile or the like. Further, as a quantization method for converting multivalued ink values into the number of tone levels which can be reproduced by the printer, various techniques such as a dither matrix method and an error diffusion method can be applied.

In step S906, the output data outputting unit 805 outputs, to the UV curing-type printer 850, the color data converted into the ink ejection signal in step S905.

Next, in step S907, the light scattering data converting unit 804 extracts the light scattering data from the stereoscopic object data divided in step S902. After resolution conversion into the resolution of the printer is performed, the light scattering data is converted into a signal for the clear ink and the UV curing timing as the printer control signal.

The resolution conversion performed here is converting data of 600 ppi, for example, into a resolution of 720 ppi or 1200 ppi for the printer, for example. Incidentally, a resolution conversion method may be realized by performing a well-known method such as the bicubic method, the bilinear method, or the nearest neighbor method, but in consideration of preservation of a difference in gloss and the like, the resolution conversion method is implemented by performing the nearest neighbor method or the like. Further, the intensity of the light scattering can be adjusted by a method disclosed in Japanese Patent Laid-Open No. 2009-208348 as described above. The 8-bit gray-scale light scattering data is converted into a UV curing timing control signal for the printer and the ejection amount of the clear ink which is effective in controlling the curing timing.

In step S908, the output data outputting unit 805 outputs, to the UV curing-type printer 850, the UV curing timing control signal and the ejection amount of the clear ink which is effective in controlling the curing timing which are obtained in the conversion in step S907. In a case where step S908 ends, the series of operations ends.

As stated above, after obtaining the color, the shape, and the light scattering as components of the stereoscopic object data, the stereoscopic object data processing apparatus 300 of the present embodiment converts the data according to the set information density, and associates and stores the data. In particular, the data can be stored efficiently by reducing unnecessary data according to the resolution of the printer and a user's sensitivity. Further, the color data, the shape data, and the light scattering data are generated as the data for the UV curing-type printer in the order of a shape layer, a color layer, and a light scattering layer, and are transmitted to the printer in this order to reproduce the texture by using the UV curing-type printer.

Embodiment 2

In Embodiment 1, there is shown the example in which the stereoscopic object data is obtained and retained, and the obtained stereoscopic object data is uniformly processed and reproduced by the UV curing-type printer. The reproducing printer is not limited to the UV curing-type printer. More specifically, the reproducing printer may be a three-dimensional printer, and it is possible to retain stereoscopic object data as data for the three-dimensional printer, and uniformly process and reproduce the obtained stereoscopic object data. In the present embodiment, explanation will be made on an example in which the stereoscopic object data is retained as the data for the three-dimensional printer. Incidentally, even in this case, it is possible to use the method for obtaining stereoscopic shape data, the method for obtaining stereoscopic color data, and the method for obtaining stereoscopic light scattering data as well.

First, explanation will be made on a data format used by the three-dimensional printer. Many three-dimensional printers support a well-known format represented as a binary format among STL formats which are input formats. As shown in FIG. 10, a binary STL format starts with any 80-byte character string, and thereafter includes 4 bytes used for an integer which indicates the number of triangles. Thereafter information on each triangle is stored in each storage region in the order of a normal vector, the coordinates of a vertex 1, the coordinates of a vertex 2, and the coordinates of a vertex 3, and a 2-byte unused area is included at the end of an area for information on each triangle. In the case of a normal three-dimensional printer, this 2-byte unused area is ignored, but in the case of a color system such as an inkjet three-dimensional printer, in particular, these two bytes are used to embed color data. However, with a data amount of 2 bytes, it is impossible to store a 24-bit image in which 8 bits are used for each color of RGB called full color, and accordingly, it is impossible to reproduce image quality which is substantially at the same level as that of a photograph. Further, since it is impossible to add information on a gloss, it is impossible to reproduce a three-dimensional object. In the present embodiment, explanation will be made on an example in which such an STL format is used to represent information on a color, a shape, and a gloss.

In the present embodiment, it is possible to use the configurations of the stereoscopic object data processing apparatus shown in FIG. 3 and the stereoscopic object data obtaining unit shown in FIG. 4 as in Embodiment 1. Explanation will be made below on the operation of the stereoscopic object data obtaining unit which is different from that of Embodiment 1.

The stereoscopic object data of the present embodiment conforms to the STL format shown in FIG. 10, and it is possible to retain and reproduce texture components such as the color and the gloss by using the unused data area for each triangle. Incidentally, since the unused data area is ignored in a general three-dimensional printer, the STL format shown in FIG. 10 is a format for stereoscopic object data which can be used for both the three-dimensional printer of the present embodiment and the general three-dimensional printer.

(Stereoscopic Object Data Obtaining Unit)

Figure 11:
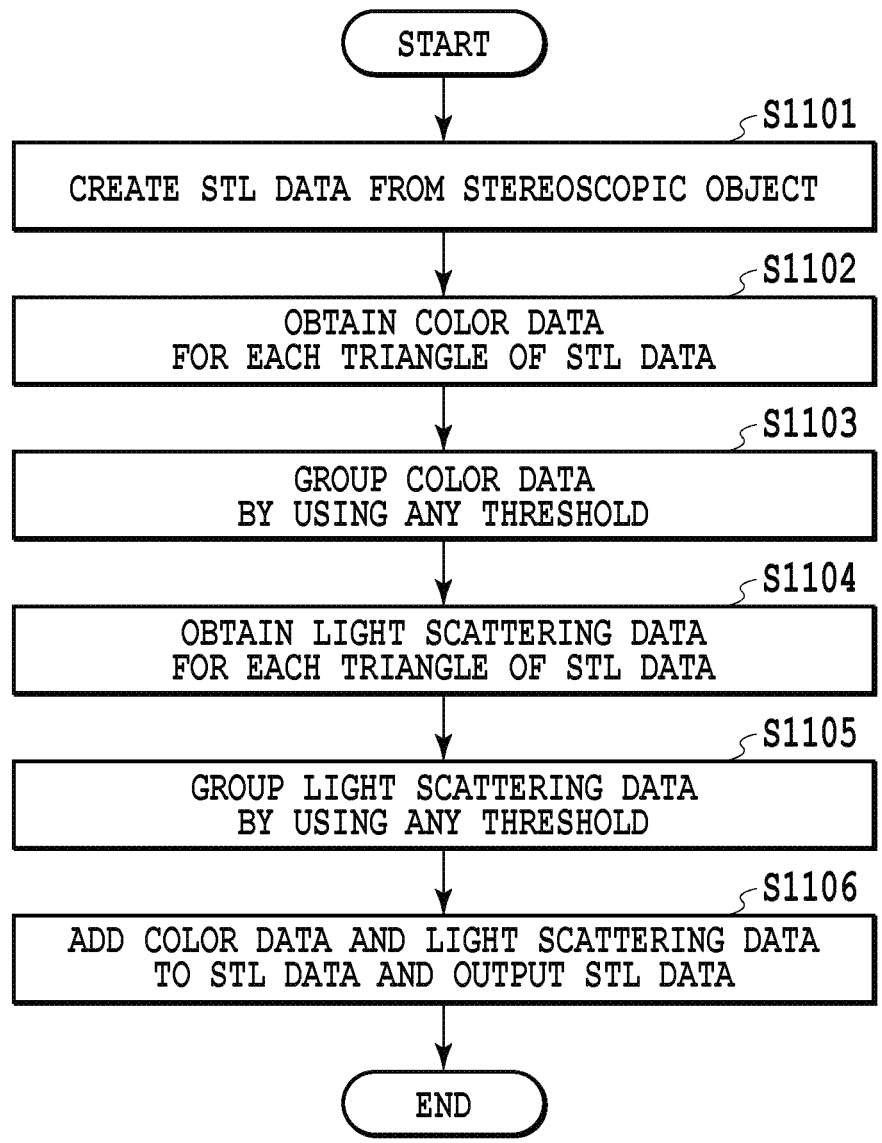
FIG. 11 is a flowchart showing a flow for obtaining stereoscopic object data according to Embodiment 2.

FIG. 11 is a flowchart showing the operation of the stereoscopic object data obtaining unit 301 of the present embodiment. Explanation will be made below with reference to FIG. 11.

Figure 12:
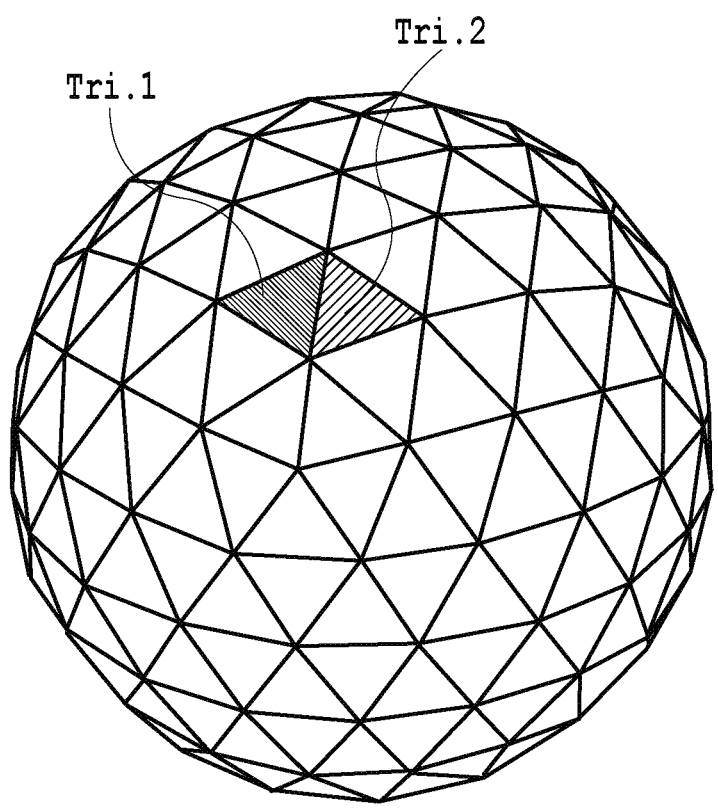
FIG. 12 is a view showing an example of shape data on a stereoscopic object according to Embodiment 2.

First, in step S1101, the stereoscopic shape data obtaining unit 402 obtains the shape of a stereoscopic object to create stereoscopic shape data of the STL format. As for generating the STL format from the stereoscopic object, there are already many products, and it is possible to generate STL data from measurement values obtained by using various methods such as the light-section method, the focus movement method, and the stereo matching method. FIG. 12 shows the visualized state of data representing a spherical object in the STL format. As shown in FIG. 12, a spherical stereoscopic object is represented by a set of small triangles (polygon data), and for example, an STL-format triangle 1 shown in FIG. 10 and an STL-format triangle 2 shown in FIG. 10 correspond to Tri. 1 and Tri. 2 in FIG. 12, respectively.

Next, in step S1102, the stereoscopic color data obtaining unit 401 obtains color data corresponding to each triangle in the STL data by using the above-described method for obtaining stereoscopic color data. Incidentally, the color data described here is, for example, RGB-format data, and gray-scale data having 8 bits for each color is obtained. More specifically, the color data is RGB data having 8 bits for each color, and the total amount of the data is 24 bits (3 bytes). In this case, 2 bytes for unused data of a triangle in the STL format shown in FIG. 10 are not sufficient to store the data.

In step S1103, the color data generating unit 405 groups the color data as unit space by using any threshold (a first threshold). The first threshold described here is a value corresponding to a color difference in the color data. For example, it is determined whether or not a color difference ΔE between Tri. 1 and Tri. 2 in FIG. 12 in a case where sRGB data is converted into CIE L*a*b* data is equal to or less than the first threshold. In a case where the color difference is equal to or less than the first threshold, the color data on Tri. 1 and Tri. 2 is grouped into one group. For example, in a case where the stereoscopic object shown in FIG. 12 is like a ball made of a single material, the color difference between Tri. 1 and Tri. 2 is within a range of a measurement error, that is, is equal to or lower than the first threshold. Accordingly, it is determined that Tri. 1 and Tri. 2 have the same color (RGB). In this case, a color representing Tri. 1 and a color representing Tri. 2 are deemed to be the same. For example, the color of Tri. 1 and the color of Tri. 2 are deemed to be a color which is the color of Tri. 1, the color of Tri. 2, or an average of the color of Tri. 1 and the color of Tri. 2, and which has one value. In the STL format, adjacent triangles are described successively, and accordingly, the information density of the color data can be reduced as compared with the information density of the shape data by comparing the triangles successively. More specifically, the resolution of the color data is made lower than the resolution of the shape data by grouping the plurality of triangles into one group and handling the group as one triangle. Accordingly, it is possible to represent the color data with the number of bits lower than the number of bits in the shape data, that is, the number of bits corresponding to the unused data area. The details will be described later.

In step S1104, the stereoscopic light scattering data obtaining unit 403 obtains light scattering data corresponding each triangle in the STL data by using the above-described method for obtaining stereoscopic light scattering data. Incidentally, the light scattering data described here is, for example, gray-scale format data.

In step S1105, the light scattering data generating unit 407 groups the light scattering data as unit space by using any threshold (a second threshold). The second threshold described here corresponds to a gloss difference in the light scattering data. The gloss difference corresponds to the value of the gray-scale data obtained by the method for obtaining stereoscopic light scattering data, and this value is, in other words, the luminance value of regular reflection light from each triangle obtained from the sensor. A difference in the luminance value is compared between Tri. 1 and Tri. 2 in FIG. 12. In a case where the stereoscopic object shown in FIG. 12 is like a ball made of a single material, the gloss difference between Tri. 1 and Tri. 2 is within a range of a measurement error, that is, is equal to or lower than the second threshold. Accordingly, it is determined that Tri. 1 and Tri. 2 have the same gloss component. In this case, a gloss (a luminance value) representing Tri. 1 and a gloss (a luminance value) representing Tri. 2 are handled as one value. For example, the luminance value of Tri. 1 and the luminance value of Tri. 2 are deemed to be one value which is the luminance value of Tri. 1, the luminance value of Tri. 2, or an average of the luminance value of Tri. 1 and the luminance value of Tri. 2. In this manner, like the information density of the color data, the information density of the light scattering data can be reduced as compared with the information density of the shape data. Incidentally, an information density necessary for gloss data varies depending on a material for the stereoscopic object and the like.

In step S1106, the stereoscopic object data outputting unit 408 adds, to the STL format, the color data and the light scattering data whose information densities are reduced by grouping as compared with the information density of the shape data. FIG. 13 shows an example of generated stereoscopic object data. The STL format shown in FIG. 13 is the same as the STL format shown in FIG. 10. For the sake of explanation, there are omitted small categories for the data on the header, the normal vector for each triangle, and the vertexes, and the unused data of each triangle are divided into small categories.

As shown in FIG. 13, the 16-bit unused data is divided into a 1-bit color data group flag, a 1-bit light scattering data group flag, and a 14-bit data area. Incidentally, the group flag is information indicating whether or not the unused data of the triangle is a first element constituting a group. For example, in a case where in step S1103, the color data is grouped into a plurality of groups, and first to fourth triangles are grouped into one group, a group flag for the first triangle is "TRUE," and group flags for the second to fourth triangles are "FALSE." Likewise, grouping information is reflected in the light scattering data. Thereafter, 24-bit color data and 8-bit light scattering data are written first to the data area for the triangle whose group flag is "TRUE" and then to the other data areas. Since a 14-bit data area for one triangle is not sufficient for the color data, the 24-bit color data is stored by using 14 bits in the data area for the first triangle and 10 bits in the data area for the second triangle. Incidentally, in a case where the color data group flag and the light scattering data group flag are both 'TRUE,' it is only necessary to set beforehand a rule that the color data is stored first, for example. In this manner, in a case where the color data and the light scattering data of the first to fourth triangles are grouped into one group, for example, the entire data area has a total of 56 bits, and are sufficient for storing 32 bits of the color data and the light scattering data. Accordingly, stereoscopic object data including texture components can be generated by adding the color data and the light scattering data to an existing STL format. The generated data is output to the stereoscopic object data storing unit. Incidentally, the size of the light scattering data may be 16 bits, and even in this case, the total size of the color data and the light scattering data is 40 bits, and the color data and the light scattering data can be sufficiently stored in the 56-bit data area.

Incidentally, in a case where the information densities of the color data and the light scattering data are not sufficiently low as compared with the shape data, and the color data and the light scattering data cannot be stored in the unused data of the STL format, it is only necessary to adjust a threshold for grouping used in step S1103 or step S1105.

Further, the format for storing data is not limited to the data format shown in FIG. 13. Data may be stored in another format. FIG. 14 shows an example in which data is stored in another data format. As shown in FIG. 14, a latter portion of data of each triangle includes the color data and the light scattering data. In this manner, in a case where the color data and the light scattering data are stored separately and successively, it is only necessary to write indexes to the unused data of each triangle so that it becomes possible to refer to the color data and the light scattering data in the latter portion. It is only necessary to write, as the indexes, reference addresses indicating where the color data is stored, and where the light scattering data is stored, for example. Further, it is possible to use the color data which is already written.

(Configuration of the Stereoscopic Object Output Data Generating Unit)

The configuration of the stereoscopic object output data generating unit can be realized by using the configuration explained in Example 1 and shown in FIG. 8. However, a three-dimensional printer (not particularly shown) is used as a printer for forming a three-dimensional shape.

Figure 15:
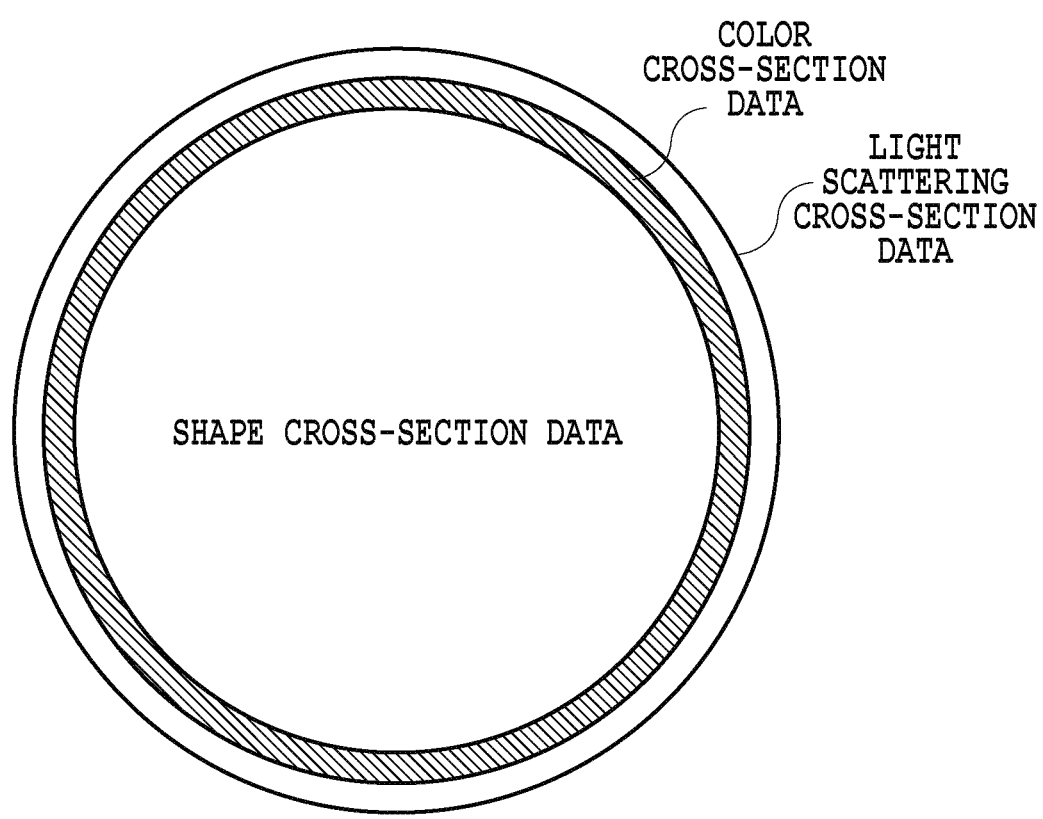
FIG. 15 is a view showing an example of stereoscopic object output cross-section data according to Embodiments 2 and 3.

Further, the three-dimensional printer forms a stereoscopic object by performing lamination according to cross-section data in various known methods such as an optical molding method, fused deposition modeling, a powder sintering method, an inkjet method, and an inkjet binder method as described above. The cross-section data in this case will be described with reference to FIG. 15. FIG. 15 shows the cross section of the spherical stereoscopic data shown in FIG. 12, for example. As shown in FIG. 15, the cross-section data includes cross-section data on the shape data at its center, cross-section data on the color data outside the cross-section data on the shape data, and cross-section data on the light scattering data at the outermost periphery. As in the case of Example 1, input stereoscopic object data is processed to output layers having the function of controlling a shape, a color, and light scattering. Data is output to the three-dimensional printer by outputting, according to the cross sections, data for forming the cross section of the shape data by ejecting a binder from an inkjet nozzle and data for forming the cross section of the color data by mixing color inks, for example. Further, the stereoscopic object output data generating unit is preferably configured so that after the cross section of the light scattering data is formed by using a clear ink for the outermost periphery, a control signal for timing of curing with UV light is output.

Further, a device for stereoscopic object output data does not have to be a single three-dimensional printer. For example, it is possible to use the configuration in which after a three-dimensional printer forms only a shape, a UV curing-type printer outputs color data and light scattering data. Generation of color data and light scattering data in the case of using a UV curing-type printer has been described before, and its detailed explanation is omitted here.

As described above, the stereoscopic object data processing apparatus 300 of the present embodiment can uniformly handle color data, shape data, and light scattering data within the scope of an STL format which can be used even for general devices after obtaining components of stereoscopic object data.

Embodiment 3

In Embodiment 2, explanation has been made on the method for retaining the stereoscopic object data as the data for the three-dimensional printer according to the conventional STL format and uniformly processing and reproducing the obtained stereoscopic object data. In a case where the stereoscopic object data is represented with the triangles in the STL format in this manner, it is impossible to retain and reproduce the color data or the gloss data whose information density is higher than that of the triangles. For example, in the case of a flat object which does not have a concavo-convex shape like a stereoscopic object shown in FIG. 16, it is possible to retain a shape even in a case where the information density of shape data is reduced. However, in a case where a flat woodgrain-pattern print is attached to the flat surface, it is impossible to retain the woodgrain-pattern information. In the present embodiment, explanation will be made on an example which is not bound by the STL format, and in which the color, shape, and light scattering of a stereoscopic object having a three-dimensional shape is retained and reproduced. Incidentally, even in this case, it is possible to use the method for obtaining stereoscopic shape data, the method for obtaining stereoscopic color data, and the method for obtaining stereoscopic light scattering data as well.

Further, the configurations of the stereoscopic object data processing apparatus shown in FIG. 3 and the stereoscopic object data obtaining unit shown in FIG. 4 remain the same and can be used. Explanation will be made below on the operation of the stereoscopic object data obtaining unit which is different from that of Embodiment 1. Incidentally, output of data on a three-dimensional shape is the same as that of Embodiment 2, and its explanation is omitted in the present embodiment.

(Stereoscopic Object Data Obtaining Unit)

Figure 17:
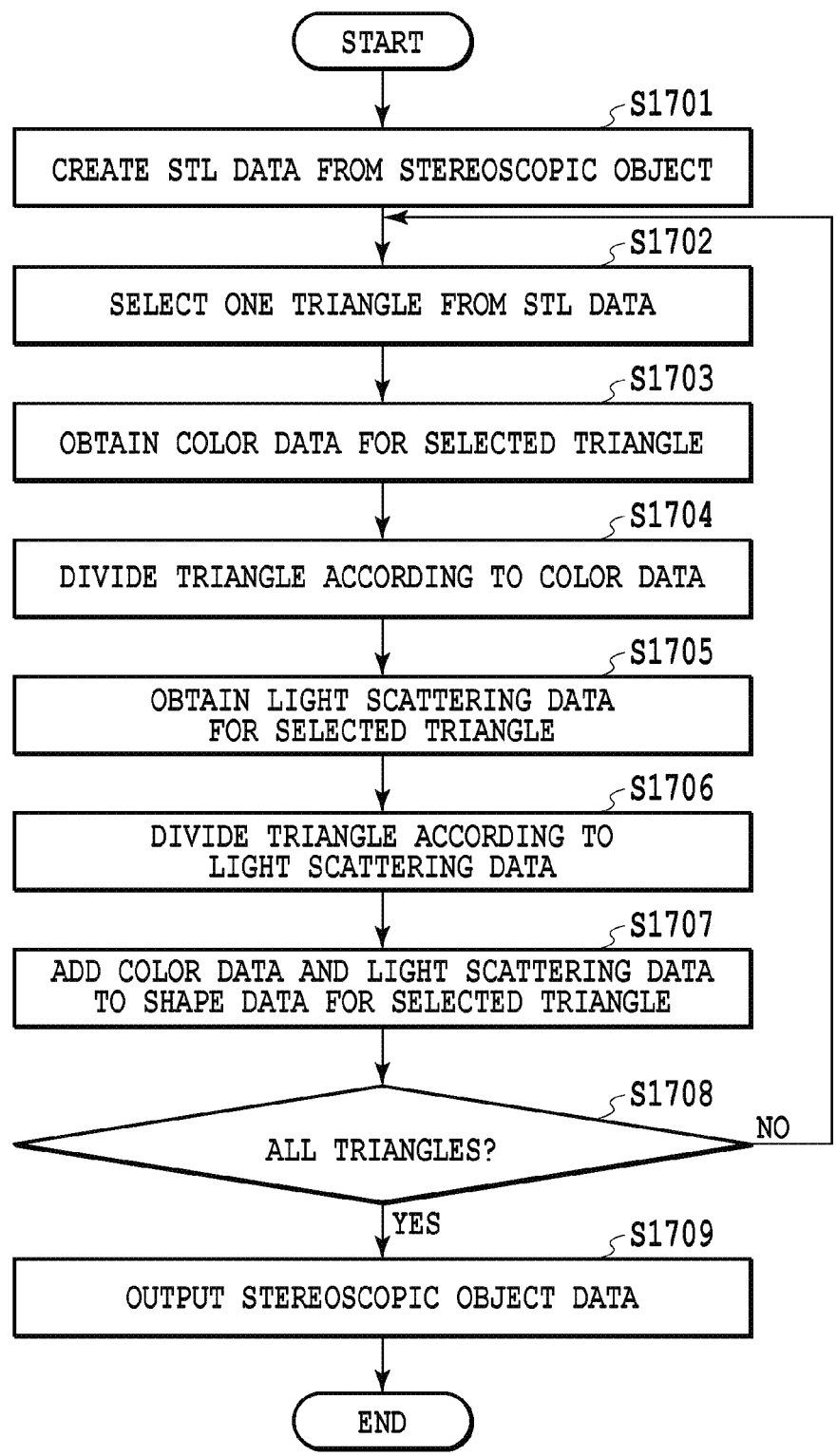
FIG. 17 is a flowchart showing a flow for obtaining stereoscopic object data according to Embodiment 3.

FIG. 17 is a flowchart showing the operation of the stereoscopic object data obtaining unit 301 shown in FIG. 5. Explanation will be made with reference to FIG. 17.

In step S1701 as in the above-described step S1101, the stereoscopic shape data obtaining unit 402 obtains the shape of a stereoscopic object, creates stereoscopic shape data in the STL format, and obtains stereoscopic object data as shown in FIG. 10, for example.

Next, in step S1702, the stereoscopic object data obtaining unit 301 selects one triangle from the obtained STL format.

Next, in step S1703, the stereoscopic color data obtaining unit 401 obtains color data corresponding to the triangle selected in step S1702 from color data obtained by using the above-described method for obtaining stereoscopic color data.

Figure 18:
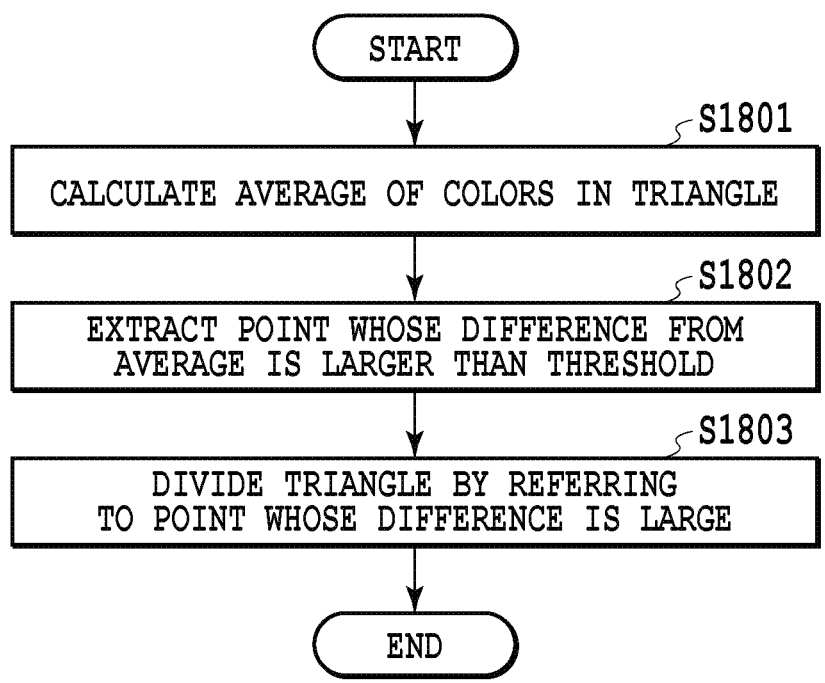
FIG. 18 is a flowchart showing a flow for dividing stereoscopic object data according to Embodiment 3.

In step S1704, the color data generating unit 405 obtains the distribution of the color data obtained in step S1703, and divides the triangle according to the distribution. Incidentally, the division of the triangle is performed according to a flow shown in FIG. 18, for example. The division of the triangle will be explained below with reference to FIG. 18.

In step S1801, the color data generating unit 405 calculates an average of colors in the triangle. The average of the color data may be an average of RGB or may be an average of CIE L*a*b* or the like which is calculated by using RGB as sRGB. Explanation will be made assuming that the average of the color data is the average of CIE L*a*b*.

Next, in step S1802, the color data generating unit 405 extracts a point whose difference from the average of the color data for the triangle is larger than any threshold. The triangle is divided according to the number of extracted points whose differences are large. Further, the difference is a color difference ΔE, and the threshold is set to be a value in the range of about 3 to about 10, for example.

In step S1803, the color data generating unit 405 divides the triangle based on the point which is extracted in step S1802 and whose difference is large. The division of the triangle is achieved by drawing a division line for a vertex angle including one point whose difference is large from any triangle vertex to an opposite side, for example. Further, as a method for dividing a triangle by referring to points on a flat surface, it is possible to use a well-known method such as Voronoi division or Delaunay triangle division. Hereinafter a divided triangle will be referred to as a sub-triangle. In a case where step S1803 ends, step S1704 ends.

In step S1705, the stereoscopic light scattering data obtaining unit 403 obtains light scattering data corresponding to the triangle selected in step S1702 from the light scattering data obtained by the above-described method for obtaining stereoscopic light scattering data.

In step S1706, the light scattering data generating unit 407 obtains the distribution of the light scattering data obtained in step S1705, and divides the triangle according to the distribution. Incidentally, the division of the triangle is performed according to a flow shown in FIG. 18, for example as in the case of the color data. The division of the triangle will be described below with reference to FIG. 18.

In step S1801, the light scattering data generating unit 407 calculates an average of colors in the triangle. The average of the light scattering data may be an average of gray-scaled pixel values or an average of luminance values which are before being converted into the gray-scaled pixel values and which are obtained by a sensor. Explanation will be made below assuming that the average of the light scattering data is the average of the gray-scaled pixel values.

Next, in step S1802, the light scattering data generating unit 407 extracts a point whose difference from the average of the light scattering data for the triangle calculated in step S1801 is larger than any threshold. The triangle is divided according to the number of extracted points whose differences are large. Further, the threshold is set to be a value in the range of about 5 to about 15, for example.

In step S1803, the light scattering data generating unit 407 divides the triangle into sub-triangles based on the point which is extracted in step S1802 and whose difference is large. The division of the triangle is achieved by drawing a division line for a vertex angle including one point whose difference is large from any triangle vertex to an opposite side, for example. Further, as a method for dividing a triangle by referring to points on a flat surface, it is possible to use a well-known method such as Voronoi division or Delaunay triangle division. In a case where step S1803 ends, step S1706 ends.

In step S1707, the stereoscopic object data outputting unit 408 adds the color data and the light scattering data to the shape data corresponding to the triangle selected in step S1702.

In step S1708, the stereoscopic object data obtaining unit 301 determines whether processing in steps S1703 to S1707 has been performed on all the triangles in the triangle set data obtained in step S1701. In a case where it is determined that the processing has not been performed on all the triangles, the process returns to step S1702. In a case where it is determined that the processing has been performed on all the triangles, the process proceeds to step S1709, and the stereoscopic object data outputting unit 408 outputs stereoscopic object data and ends the process.

Incidentally, FIG. 19 shows an example of data output in a case where all the steps shown in FIG. 17 have been completed. FIG. 19 shows a unique format different from the STL. Its header and data on a normal vector for and vertexes of each triangle are the same as those of the STL, and these small categories are omitted for the sake of explanation. Small categories for color data and light scattering data of each triangle are listed. As shown in FIG. 19, the color data includes 2-byte data indicating a division number into which one triangle in the shape data is divided based on the color data, the division number of sets of 24-bit color data, and the division number of sets of 36-byte vertex data for sub-triangles obtained by division. Further, subsequent light scattering data includes 2-byte data indicating a division number into which one triangle in the shape data is divided based on the light scattering data, the division number of sets of 8-bit light scattering data, and the division number of sets of 36-byte vertex data for sub-triangles obtained by division. They are information on one triangle, and the stereoscopic object data includes sets of such information for the number of necessary triangles. In this manner, in the present embodiment, there may be a case where the information density of the color data or the light scattering data is higher than that of the shape data (the shape data on the triangles before division). Incidentally, the number, shapes and the like of sub-triangles obtained by dividing an STL triangle may vary depending on the color data and the light scattering data.

Further, the output data is not limited to the example shown in FIG. 19. For example, an example shown in FIG.

20 includes shape data on each STL triangle, data indicating an index for a color data, and data indicating an index for a light scattering data palette. Further, the example shown in FIG. 20 additionally includes, after all the triangle data, an index and an information storage location table for the color data and an index and an information storage location table for the light scattering data. Further, the example shown in FIG. 20 additionally includes information on the color data which is two-dimensional (W×H pixel) RGB image data (W and H are positive integers). Further, the example shown in FIG. 20 additionally includes information on the light scattering data which is two-dimensional (W×H pixel) grayscale image data (W and H are positive integers). In this manner, it is possible to record the high-resolution information on the color and the light scattering in the data on the shape represented by one polygon unit. Further, the index for the color data palette and the index for the light scattering data palette are additionally included in the data on each triangle, and each have a size of 1 byte. More specifically, since it becomes possible to store a total of 2 bytes of data in the unused data of the conventional STL data, it becomes possible to achieve an advantageous result such as an improvement in affinity with the STL format.

As described above, the stereoscopic object data processing apparatus 300 of the present embodiment can retain not only the color data whose information density is higher than that of the shape data, but also the light scattering data after obtaining the color, the shape, and the light scattering as the components of the stereoscopic object data. Further, it becomes possible to reproduce a stereoscopic object having the texture which is very close to that of an actual object via the stereoscopic object output data generating unit 303.

Embodiment 4

The stereoscopic object data obtaining unit 301 of Embodiments 1 to 3 individually handles data to be output by the UV curing-type printer and the three-dimensional printer. In the present embodiment, explanation will be made on an example in which data is automatically created according to the type of outputting printer from stereoscopic object data obtained by a method for obtaining stereoscopic shape data. More specifically, explanation will be made on an example in which it is automatically determined whether data is data to be output by the UV curing-type printer or data to be output by the three-dimensional printer.
(Stereoscopic Object Data Obtaining Unit)

Figure 21:
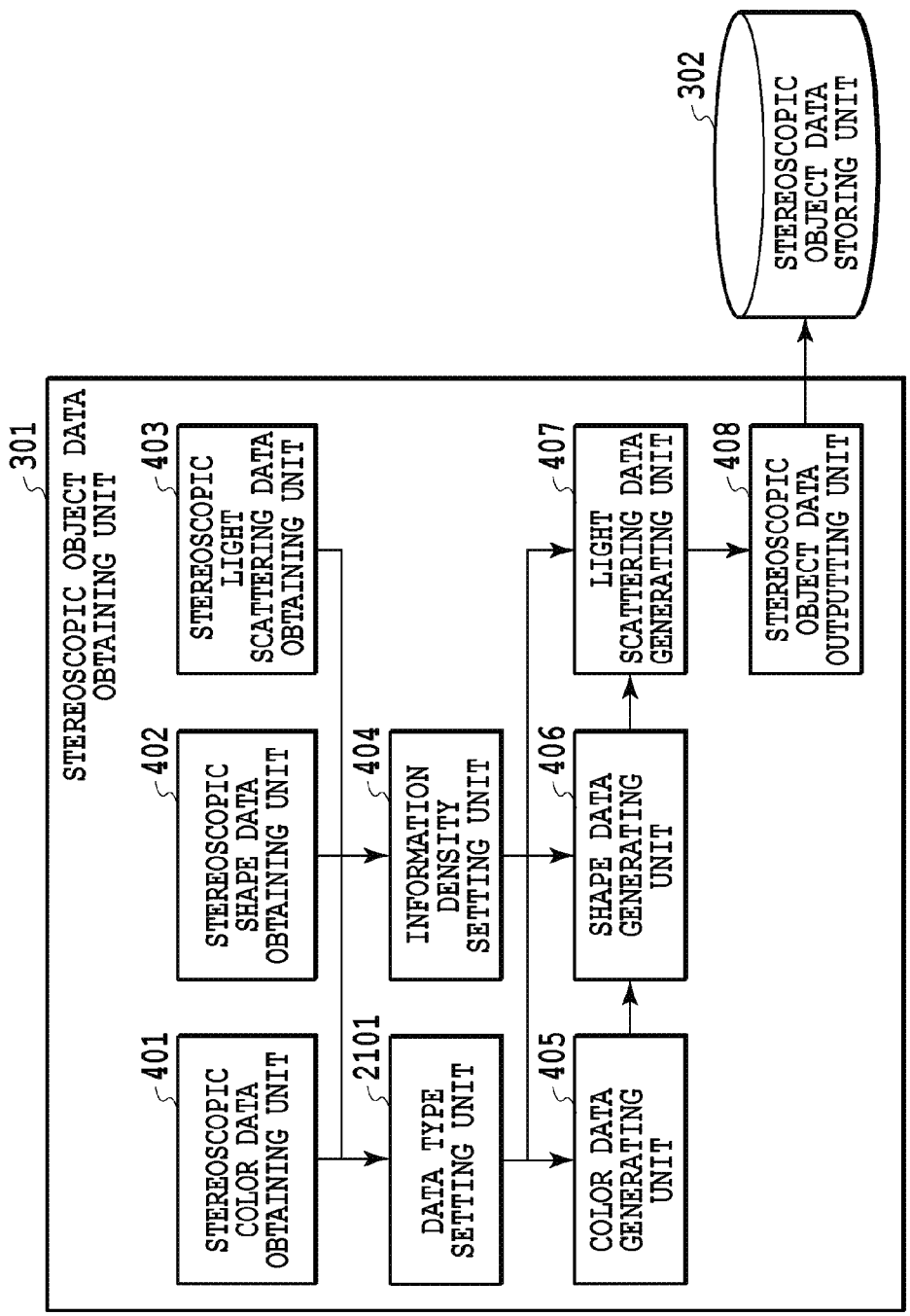
FIG. 21 is a diagram showing an example of the configuration of a stereoscopic object data obtaining unit according to Embodiment 4.

FIG. 21 shows the configuration of the stereoscopic object data obtaining unit 301 of the present embodiment. Incidentally, in the configuration shown in FIG. 21, the same reference numerals are used for processing units which perform the same operations as those of FIG. 4. As shown in FIG. 21, a data type setting unit 2101 is newly added.

Figure 22:
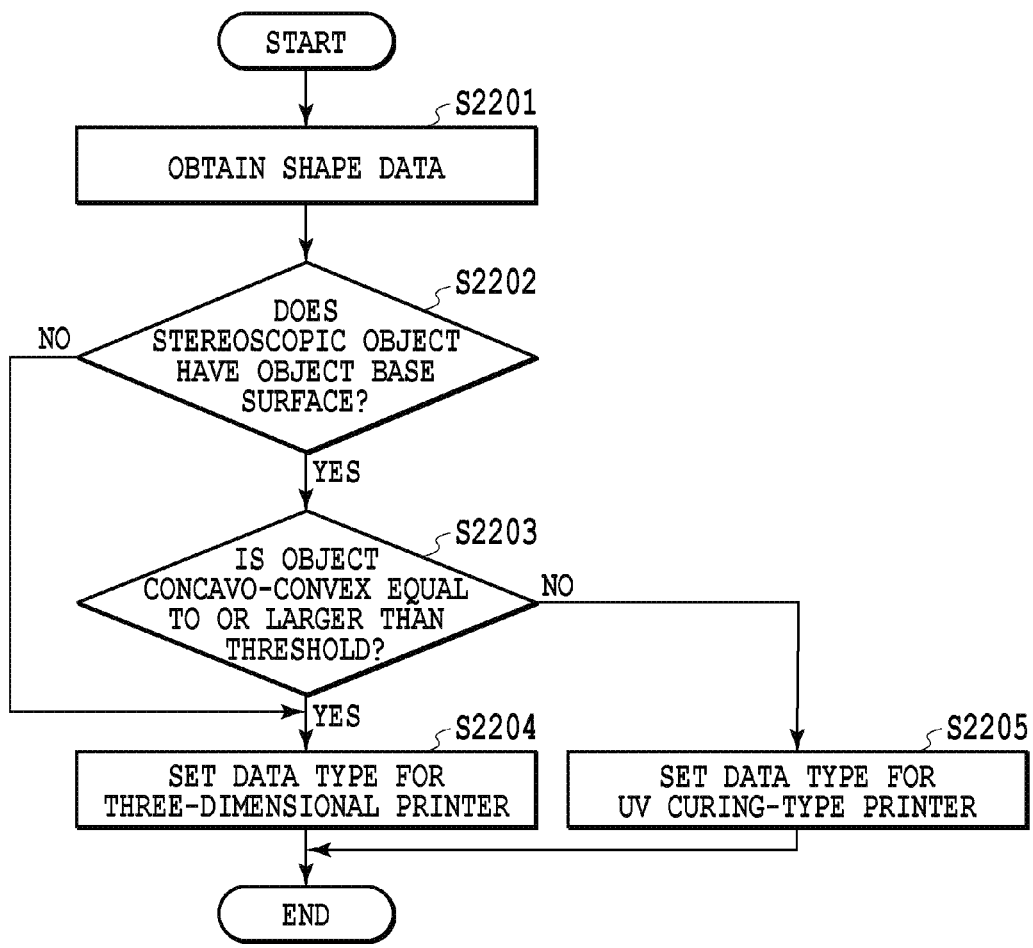
FIG. 22 is a flowchart showing a flow for setting a stereoscopic object data type according to Embodiment 4.

FIG. 22 is a flowchart showing the operation of the data type setting unit 2101. Explanation will be made below with reference to FIG. 22.

First, in step S2201, the data type setting unit 2101 measures the shape of a target stereoscopic object by using the light-section method, the focus movement method, the stereo matching method, or the like.

Next, in step S2202, the data type setting unit 2101 determines whether or not the shape of the target stereoscopic object has an object base surface which becomes a base. Here, the object base surface of the stereoscopic object will be described with reference to FIGS. 23A and 23B. An example shown in FIGS. 23A and 23B is the one in a case where the stereoscopic object is mounted on a flat reference surface, for the sake of explanation. FIG. 23A shows a sample obtained by applying oil paints to a canvas or the like which is a base for an oil painting to form concavo-convex, for example. Leather, wood, or the like can also be used. Such a sample is a stereoscopic object having a flat portion (an object base surface) parallel to a flat reference surface. In this case, in step S2202, it is determined that the stereoscopic object has the object base surface, and the process proceeds to step S2203. On the other hand, FIG. 23B shows a case where the object does not have any flat portion (object flat surface) (the flat reference surface=the object base surface). In this case, in step S202, it is determined that the stereoscopic object does not have the object base surface, and the process proceeds to step S2204.

In step S2203, the data type setting unit 2101 determines whether or not the amplitude of the object concavo-convex relative to the object base surface is equal to or larger than a threshold. The threshold varies depending on the performance of an output device, and is, for example, about 2 mm, in a case where the above-described UV curing-type printer reproduces the concavo-convex, for example. In a case where it is determined that the amplitude of the concavo-convex is equal to or larger than the threshold, the process proceeds to step S2204, and in a case where it is determined that the size of the concavo-convex is less than the threshold, the process proceeds to step S2205.

In a case where the process proceeds to step S2204, it is determined in step S2202 that the stereoscopic object does not have the object base surface or it is determined in step S2203 that the size of the object concavo-convex is equal to or larger than the threshold. In this case, since it is determined that it is difficult to reproduce the stereoscopic object by the UV curing-type printer, the data type setting unit 2101 sets a data type for the 3D printer. As described in Example 2, for example, subsequent processing is performed to generate stereoscopic object data which is compatible with data for the 3D printer.

In step S2205, the data type setting unit 2101 performs setting for the stereoscopic object which is determined in step S2203 to have the object concavo-convex which is smaller than the threshold. In this case, since it is determined that the UV curing-type printer can reproduce the stereoscopic object, the data type setting unit 2101 sets a data type for the UV curing-type printer. As described in Example 1, for example, subsequent processing is performed to generate data for the UV curing-type printer as the stereoscopic object data. In a case where step S2204 or S2205 ends, the series of operations ends.

As described above, the stereoscopic object data processing apparatus 300 of the present embodiment can change setting according to the output printer at the time of generating the stereoscopic object data.
<Variation>

The stereoscopic object data for the three-dimensional printer in Embodiments 2 to 4 includes information on a color, a shape, and light scattering for one file as shown in the data structures shown in FIGS. 13, 14, 19, and 20, but is not limited to these data structures. In a variation, it is possible to store a color, a shape, and light scattering in different files, respectively. More specifically, it is possible to input, to the data area in FIG. 13, the addresses of data files which store color data and light scattering data. Even in this case, it is possible to retain information on a stereoscopic object having a small amount of data and the texture which is very close to that of an actual object by using the color data group flag and the light scattering data group flag.

Figure 16:
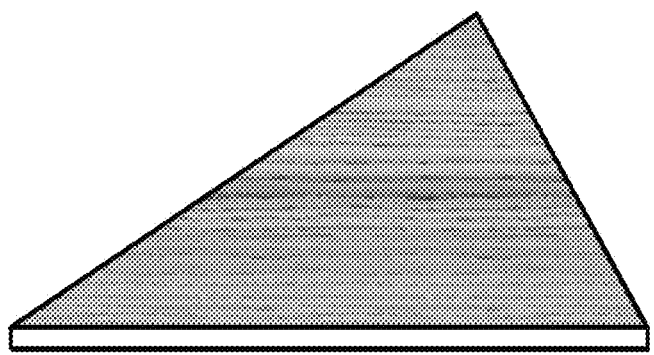
FIG. 16 is a view showing an example of stereoscopic object data according to Embodiment 3.

Further, it is possible to input, to the data area in FIG. 13, the addresses of two-dimensional RGB color data and two-dimensional gray-scale light scattering data corresponding to data for each triangle, for example. In this case, it is possible to retain color data and light scattering data for the stereoscopic object which has a simple shape and a complicated surface as shown in FIG. 16, for example, by using the conventional STL format.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to provide a uniform information format to be used in a case where the output apparatus such as the UV curing-type printer or the three-dimensional printer reproduces the texture of a stereoscopic object having a three-dimensional shape.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-157624, filed Aug. 1, 2014, which is hereby incorporated by reference wherein in its entirety.

What is claimed is:

1. An information processing apparatus comprising:
   an obtaining unit configured to obtain shape data including data which indicates vertexes of each of a plurality of polygons representing a stereoscopic object and color data indicating a color of each of the polygons;
   a converting unit configured to convert the shape data and the color data into shape data and color data in a data format including an area which stores the shape data and an unused area which does not store the shape data, and to change a size of the unused area corresponding to the plurality of polygons according to a type of stereoscopic object forming apparatus for forming the stereoscopic object, wherein color data on one of the plurality of polygons is stored in the unused areas corresponding to a plurality of polygons; and
   an outputting unit configured to output the converted shape data and color data.

2. The information processing apparatus according to claim 1, wherein the obtaining unit obtains light scattering data on each of the polygons.

3. The information processing apparatus according to claim 1, wherein the converting unit converts the shape data and the color data into the shape data and the color data having data amounts corresponding to resolutions of a stereoscopic object forming apparatus enabling to reproduce the stereoscopic object.

4. The information processing apparatus according to claim 1, wherein the data format including the area which stores the shape data and the unused area which does not store the shape data is an STL format.

5. The information processing apparatus according to claim 2, wherein the converting unit adds, to one polygon, a plurality of pieces of color data and a plurality of pieces of light scattering data.

6. The information processing apparatus according to claim 2, wherein the converting unit adds, to the unused area, a flag indicating whether or not the color data or the light scattering data is included, and adds the color data or the light scattering data to a plurality of unused areas corresponding to a plurality of polygons.

7. The information processing apparatus according to claim 2, wherein the converting unit adds, to the unused area, data indicating a reference destination of the color data and the light scattering data.

8. The information processing apparatus according to claim 1, wherein the converting unit converts the color data to increase an amount of the color data in a case where the stereoscopic object forming apparatus is a UV curing-type stereoscopic object forming apparatus.

9. The information processing apparatus according to claim 1, wherein the converting unit converts the shape data to increase an amount of the shape data in a case where the stereoscopic object forming apparatus is a three-dimensional printer.

10. A non-transitory computer readable storage medium storing data, wherein a data structure of the data is a data structure including a first storage area which indicates a normal vector for a triangle, a second storage area which indicates coordinates of each vertex of the triangle, and a third storage area whose storage capacity is smaller than those of the first storage area and the second storage area, and in the data structure, the data is consecutively stored, and
   a plurality of third storage areas corresponding to a plurality of consecutive triangles store data which indicate same color data or light scattering data corresponding to the plurality of consecutive triangles.

11. The non-transitory computer readable storage medium according to claim 10, wherein out of the plurality of third storage areas corresponding to the plurality of consecutive triangles, part of the third storage areas corresponding to part of the triangles include data indicating whether data stored in the third storage areas is color data or light scattering data.

12. An information processing method comprising:
   obtaining shape data including data which indicates vertexes of each of a plurality of polygons representing a stereoscopic object and color data indicating a color of each polygon;

converting the shape data and the color data into shape data and color data in a data format including an area which stores the shape data and an unused area which does not store the shape data, wherein color data on one of the plurality of polygons is stored in the unused areas corresponding to a plurality of polygons;

changing a size of the unused area corresponding to the plurality of polygons according to a type of stereoscopic object forming apparatus for forming the stereoscopic object; and outputting the converted shape data and color data.

13. A non-transitory computer readable storage medium storing a program which causes a computer to perform an information processing method, the method comprising:

obtaining shape data including data which indicates vertexes of each of a plurality of polygons representing a stereoscopic object and color data indicating a color of each polygon;

converting the shape data and the color data into shape data and color data in a data format including an area which stores the shape data and an unused area which does not store the shape data, wherein color data on one of the plurality of polygons is stored in the unused areas corresponding to a plurality of polygons;

changing a size of the unused area corresponding to the plurality of polygons according to a type of stereoscopic object forming apparatus for forming the stereoscopic object; and outputting the converted shape data and color data.

\* \* \* \* \*